(12) United States Patent
Creighton et al.

(10) Patent No.: US 11,740,952 B2
(45) Date of Patent: Aug. 29, 2023

(54) INTERCONNECTED FRAMEWORK FOR DISTRIBUTED DATA REALIZATION

(71) Applicant: Express Scripts Strategic Development, Inc., St. Louis, MO (US)

(72) Inventors: Christopher L. Creighton, Cincinnati, OH (US); Jason M. Creighton, Cincinnati, OH (US); Michael S. Ha, Houston, TX (US); Zachary Clark, St. Louis, MO (US); Daniel J. Rueschhoff, Jr., Wentzville, MO (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 38 days.

(21) Appl. No.: 17/362,162

(22) Filed: Jun. 29, 2021

(65) Prior Publication Data

US 2021/0326195 A1 Oct. 21, 2021

Related U.S. Application Data

(63) Continuation of application No. 16/861,483, filed on Apr. 29, 2020, now Pat. No. 11,055,158, which is a continuation of application No. 15/986,743, filed on May 22, 2018, now Pat. No. 10,678,615.

(51) Int. Cl.
*G06F 9/54* (2006.01)
*H04L 9/40* (2022.01)

(52) U.S. Cl.
CPC .............. *G06F 9/546* (2013.01); *G06F 9/542* (2013.01); *G06F 9/543* (2013.01); *G06F 9/547* (2013.01); *H04L 63/08* (2013.01)

(58) Field of Classification Search
None
See application file for complete search history.

(56) References Cited

U.S. PATENT DOCUMENTS

| | | |
|---|---|---|
| 6,085,229 A | 7/2000 | Newman |
| 6,593,944 B1 | 7/2003 | Nicolas |
| 7,293,034 B2 | 11/2007 | Paya |

(Continued)

FOREIGN PATENT DOCUMENTS

EP WO 2013120325 A1 * 8/2013 ............. H04L 67/02

*Primary Examiner* — Charles E Anya
(74) *Attorney, Agent, or Firm* — Miller Johnson

(57) ABSTRACT

Embodiments of the present disclosure provide a system, including at least one processor and a memory component having instructions stored thereon, which, when executed by the processor, cause the processor to perform operations, including presenting data from a distributed network of data sources via a user interface of a user device, by identifying a set of frames associated with the user, the frames including data from the data sources loaded into frames of a container page, authenticating the set of frames, and generating the container page for display. Operations include facilitating secure communications between the authenticated frames of the container page, by receiving a message from one of the authenticated frames, verifying authenticated status of the sender frame, and transmitting the message to target frames. Operations further include presenting an updated version of the data from the data sources, based on the secure communications, by updating the container page.

20 Claims, 16 Drawing Sheets

(56) References Cited

U.S. PATENT DOCUMENTS

| | | | |
|---|---|---|---|
| 8,423,651 B1 * | 4/2013 | Grieve | G06F 9/54 709/227 |
| 8,635,535 B2 | 1/2014 | Shaty | |
| 9,560,110 B1 * | 1/2017 | Lewis | H04W 4/21 |
| 10,257,253 B1 | 4/2019 | Freedman | |
| 2002/0054052 A1 | 5/2002 | Sharma | |
| 2002/0186237 A1 | 12/2002 | Bradley | |
| 2006/0212803 A1 * | 9/2006 | Arokiaswamy | G06F 16/972 715/201 |
| 2007/0300064 A1 * | 12/2007 | Isaacs | G06F 16/957 713/168 |
| 2008/0263566 A1 * | 10/2008 | Buerge | G06F 16/00 719/317 |
| 2008/0294716 A1 * | 11/2008 | Couvreur | G06Q 30/0214 705/14.16 |
| 2008/0301643 A1 * | 12/2008 | Appleton | H04L 67/52 717/124 |
| 2009/0037806 A1 | 2/2009 | Yang | |
| 2009/0132713 A1 * | 5/2009 | Dutta | G06F 16/958 709/227 |
| 2010/0125895 A1 * | 5/2010 | Shull | H04L 63/08 726/4 |
| 2010/0281107 A1 * | 11/2010 | Fallows | G06F 9/54 715/760 |
| 2011/0055683 A1 | 3/2011 | Jiang | |
| 2012/0047517 A1 * | 2/2012 | Townsend | H04M 3/5191 709/227 |
| 2014/0101447 A1 * | 4/2014 | Lekies | H04L 9/0841 713/169 |
| 2015/0193421 A1 | 7/2015 | Chitilian | |
| 2015/0199317 A1 | 7/2015 | Lemonik | |
| 2015/0248723 A1 | 9/2015 | Chandi | |
| 2016/0205088 A1 * | 7/2016 | Sreesha | H04L 67/06 726/8 |
| 2016/0259509 A1 | 9/2016 | Alexander | |
| 2016/0323353 A1 | 11/2016 | Noldus | |
| 2016/0342752 A1 | 11/2016 | Stueckemann | |
| 2017/0154013 A9 | 6/2017 | Liang | |
| 2018/0191735 A1 | 7/2018 | Lahoz | |
| 2018/0367572 A1 | 12/2018 | Frisbie | |

* cited by examiner

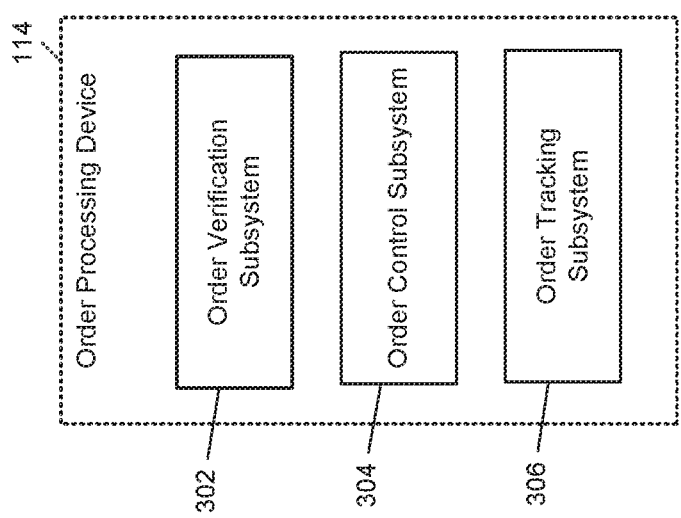

INTERCONNECTED FRAMEWORK FOR DISTRIBUTED DATA REALIZATION

CROSS-REFERENCE TO RELATED APPLICATIONS

This application is a continuation of U.S. patent application Ser. No. 16/861,483, filed on Apr. 29, 2020; said application is a continuation of U.S. patent application Ser. No. 15/986,743, filed on May 22, 2018 and issued as U.S. Pat. No. 10,678,615 on Jun. 9, 2020; the entire disclosures of which are incorporated herein by reference.

FIELD

The present disclosure relates to web applications and more particularly to cross-site communication within web applications.

BACKGROUND

In any organization, there are myriad sources of data and often just as many display and analysis systems for visualizing that data. Sometimes the data can be accessed using a standard web browser, while other data must be viewed in a spreadsheet program, database program, or business intelligence (BI) system. If a user or analyst who needs to view a variety of disparate data sources is lucky, each of these data sources can be viewed in a single medium, such as a web browser. For example, multiple sites may be opened in tabs of the web browser. Each of these sites may be located on different servers, and may have different access rights and require different credentials. For security reasons, these sites do not interact with each other through the web browser. Therefore, in order to perform data analysis that is coordinated across the various sites, the analyst must manually control each of the tabs to show relevant data for the task at hand.

A number of systems allow for disparate data to be aggregated, such as by implementing intricate extract, transform, and load (ETL) processes. Once all the data is in a single location, a variety of views can be realized. For example only, web parts or widgets can be created based on the aggregated data in the SharePoint collaborative web platform from Microsoft Corp. The SharePoint widgets can be distributed across a single page. However, even between SharePoint widgets in a SharePoint site, bidirectional communication and other interaction is limited.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A web-based display system includes a frame loading module, a transformation interface module, and a communication module. The frame loading module is configured to, in response to loading of a parent web page, load a plurality of frames, including a first frame from a first location and a second frame from a second location. The transformation interface module is configured to present a user interface element to a user in the parent web page. The user interface element is configured to receive a filtering selection from the user. The communication module is configured to assign a first unique identifier to the first frame. The communication module is configured to, in response to loading of the first frame, transmit a first handshake request to the first frame. The first handshake request includes the first unique identifier. The communication module is configured to, in response to receiving a first message from the first frame, selectively broadcast a first broadcast message to all of the plurality of frames. The communication module is configured to, assign a second unique identifier to the second frame. The communication module is configured to, in response to loading of the second frame, transmit a second handshake request to the second frame. The second handshake request includes the second unique identifier. The communication module is configured to, in response to receiving a second message from the second frame, selectively broadcast a second broadcast message to all of the plurality of frames. The communication module is configured to, in response to the transformation interface module receiving the filtering selection from the user, broadcast a filter message based on the filtering selection to all of the plurality of frames.

In other features, the filtering selection specifies a range of dates. In other features, the communication module is configured to avoid broadcasting the first message when the first message is a handshake completion message and avoid broadcasting the second message when the second message is a handshake completion message. In other features, the system includes an identifier store configured to store identifiers, including the first unique identifier and the second unique identifier, corresponding to the plurality of frames. The communication module is configured to reject incoming messages lacking an identifier found in the identifier store.

In other features, the system includes a marketplace module configured to store metadata regarding a set of frames, display the metadata to the user, and designate the plurality of frames in response to selections by the user. The metadata for each frame of the set of frames includes a location from which the frame can be loaded. In other features, the metadata for each frame of the set of frames indicates a set of filtering capabilities of the frame. In other features, the system includes an authentication module configured to prevent loading of the plurality of frames until the user successfully authenticates.

In other features, the authentication module is configured to, based on successful authentication by the user, provide authentication credentials to each of the plurality of frames. In other features, the frame loading module is configured to display to the user, for each frame of the plurality of frames, filter indicia indicating which filters are applied to the frame. In other features, for each frame of the plurality of frames, the filter indicia indicates which filtering options are recognized by the frame.

A method of operating a web-based display system includes, in response to loading of a parent web page, load a plurality of frames, including a first frame from a first location and a second frame from a second location. The method includes assigning a first unique identifier to the first frame. The method includes in response to loading of the first frame, transmitting a first handshake request to the first frame. The first handshake request includes the first unique identifier. The method includes in response to receiving a first message from the first frame, selectively broadcasting a first broadcast message to all of the plurality of frames. The method includes assigning a second unique identifier to the second frame. The method includes in response to loading of the second frame, transmitting a second handshake request to the second frame. The second handshake request includes the second unique identifier. The method includes in response to receiving a second message from the second frame, selectively broadcasting a second broadcast message to all of the plurality of frames. The method includes presenting a user interface element to a user in the parent web page. The user interface element is configured to receive a filtering selection from the user. The method includes in response to receiving the filtering selection from the user, broadcasting a filter message based on the filtering selection to all of the plurality of frames.

In other features, the filtering selection specifies a range of dates. In other features, the method includes avoiding broadcasting the first message when the first message is a handshake completion message and avoiding broadcasting the second message when the second message is a handshake completion message. In other features, the method includes storing identifiers, including the first unique identifier and the second unique identifier, corresponding to the plurality of frames in an identifier store. The method includes rejecting incoming messages lacking an identifier present in the identifier store.

In other features, the method includes storing metadata regarding a set of frames, displaying the metadata to the user, and designating the plurality of frames in response to selections by the user. The metadata for each frame of the set of frames includes a location from which the frame can be loaded. In other features, the metadata for each frame of the set of frames indicates a set of filtering capabilities of the frame.

In other features, the method includes preventing loading of the plurality of frames until the user successfully authenticates. In other features, the method includes, in response to successful authentication by the user, providing authentication credentials to each of the plurality of frames. In other features, the method includes displaying to the user, for each frame of the plurality of frames, filter indicia indicating which filters are applied to the frame. In other features, for each frame of the plurality of frames, the filter indicia indicates which filtering options are recognized by the frame.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 3 is a functional block diagram of an example order processing device, which may be deployed within the system of FIG. 1.

In the drawings, reference numbers may be reused to identify similar and/or identical elements.

DETAILED DESCRIPTION

Introduction

Figure 1:
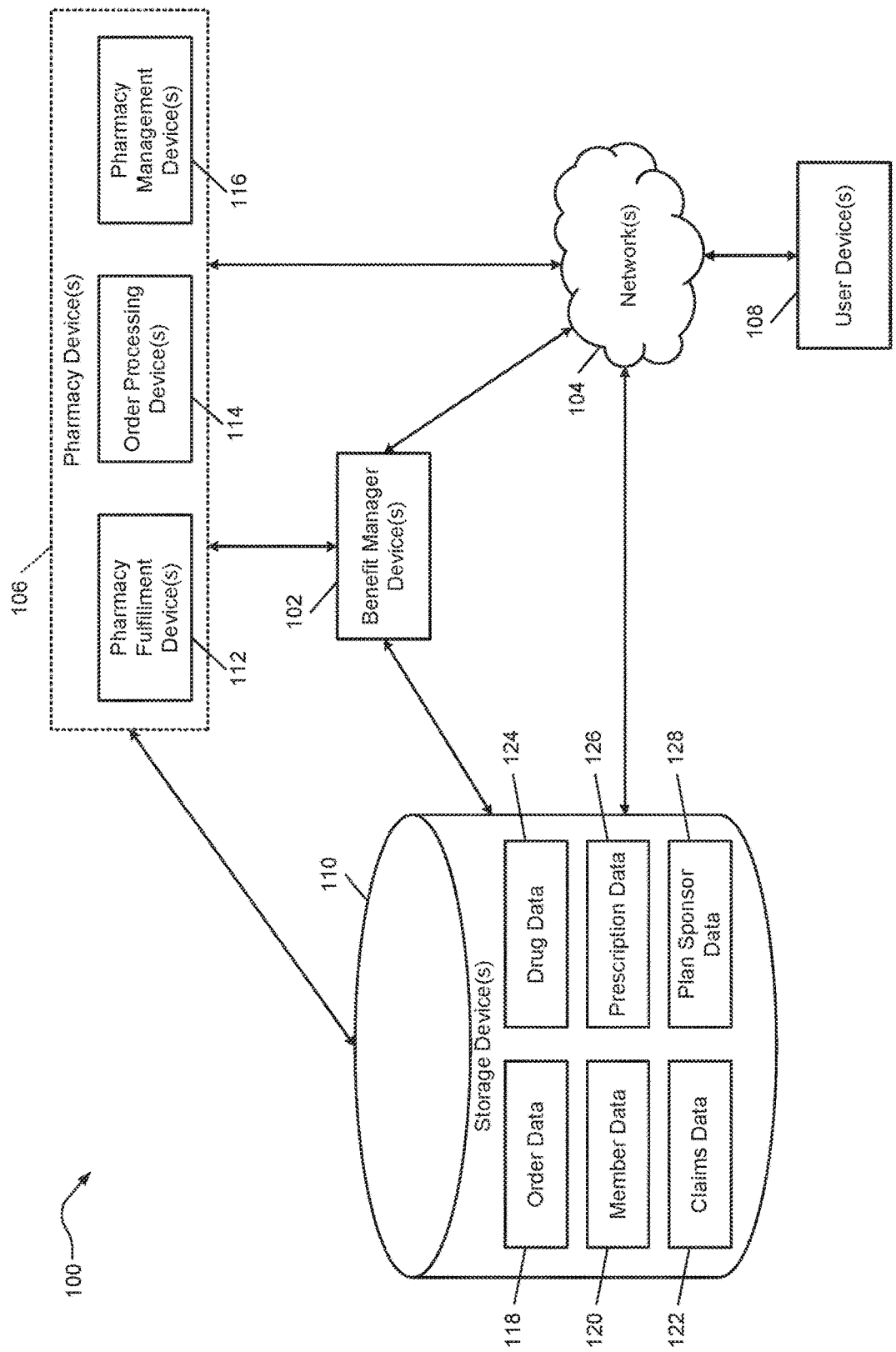
FIG. 1 is a functional block diagram of an example system including a high-volume pharmacy.

To assemble data from a distributed network of data sources, the present disclosure describes a technological solution that loads content from multiple different webpages into a single container page. For example, multiple webpages may be shown on the container page by loading each separate site into a respective inline frame (iframe). These webpages (referred to as frames below for simplicity) are not necessarily all hosted on the same web server. Therefore, security and technological restrictions would generally prevent these separate frames from interacting with each other.

However, the present disclosure describes a framework for the container page to facilitate communication among the individual frames. The operator of the container page website may make integration code (such as a JavaScript library) available to developers of the frames. A developer of a frame can leverage this integration code to permit communication with other frames and with the container page.

When the container page loads a frame, the container page assigns a unique identifier to the frame and transmits that identifier to the frame as part of a handshake. The container also sends an identifier of the container itself to the frame. The integration code in the frame can then use the identifier of the container to transmit data to the container. When the frame transmits data to the container, that data can be broadcast to all the other frames. This rebroadcast capability can be used to allow communication between frames.

One example of data communication presented in the present disclosure is filtering. For example, a single filter command (such as an instruction to filter to a particular date range, such as "today") may be imposed on the container page by a user. The container page can then send a filter message to each of the frames. Each frame receives this message via its integration code and passes the message to an associated handler, if any. If a corresponding message handler is implemented by the frame's developer, data displayed in the frame can be transformed according to the parameters contained in the filter message. If no handler is present, or the particular handler cannot act on the provided parameters, the data display may remain the same. In various implementations, no error message is transmitted back to the container page in response to failure to act upon the filter message.

In various implementations, each frame may itself have filtering user interface elements, such as to filter by date or by customer. When one of these filtering options is selected for a frame, a filter message may be sent by the frame to the container page for distribution to the rest of the frames. In various implementations, the frame may discard a broadcast message that originated from that same frame; in other implementations, the container page may avoid sending a message back to the originator.

The multiple frames in one container page may be referred to as widgets and provide a user with the ability to make a rapid assessment of the data of interest to that user. In addition to placing multiple data sources on one screen, a system according to the present disclosure allows the data sources to remain synchronized, such as by all being filtered to the same date range.

As another example of cross-frame coordination, the container page may relate to a pharmacy benefit manager (PBM), pharmacy, or health plan. In such a case, one of the frames selected for display in the container page may include a list of drugs. Selecting one of the drugs from the list causes the frame to send a message indicating the selected drug to the container page. The message is broadcast to all the frames, causing some or all to transform their data to show information related to the selected drug. The frames may further be filtered based on date range so that fulfillment and order data related to a specific drug within a specified time range can be viewed at once.

Each of the frames may be provided to the container page website by the respective web developers. The container may implement a marketplace feature so that a user of the container page can select which frames will be displayed. In an instance where data of interest or analysis code does not have a web front-end, a web wrapper may be created that acts as an interface to the analysis code or data of interest. This wrapper can be submitted to the marketplace as a frame.

In addition to providing unique user interface (UI) improvements, the present disclosure reduces the need for costly ETL procedures that would aggregate multiple disparate sources of data into a single system. Without loading all of the data into a single system, the present disclosure also avoids logistical and security-based concerns—for example, a single system might require attempting to harmonize access rights across a variety of user directories and access rights structures. A single-sign-on approach may be used so that authentication to a computer, a domain controller, or the container page may allow a user to access some or all of the frames in the container page. In various implementations, the user may need to authenticate to each of the frames according to the security policies of each of the frames—for example, the user may need to supply a respective username and password within each frame (or perhaps once for multiple frames that are served from a single website). In various implementations, each frame may query the browser for a token so that if the user has logged in to access a certain resource, the user will not have to log in again to access a widget corresponding to that resource.

As mentioned above, the present disclosure can be used in an environment where pharmacy benefit data, healthcare data, and pharmacy fulfillment data is relevant. Such a system and a description of various types of data that may be made available in frames according to the principles of the present disclosure, are presented in FIGS. 1, 2, and 3.

High-Volume Pharmacy

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104. The system 100 may also include a storage device 110.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in the storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Va.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the use of the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
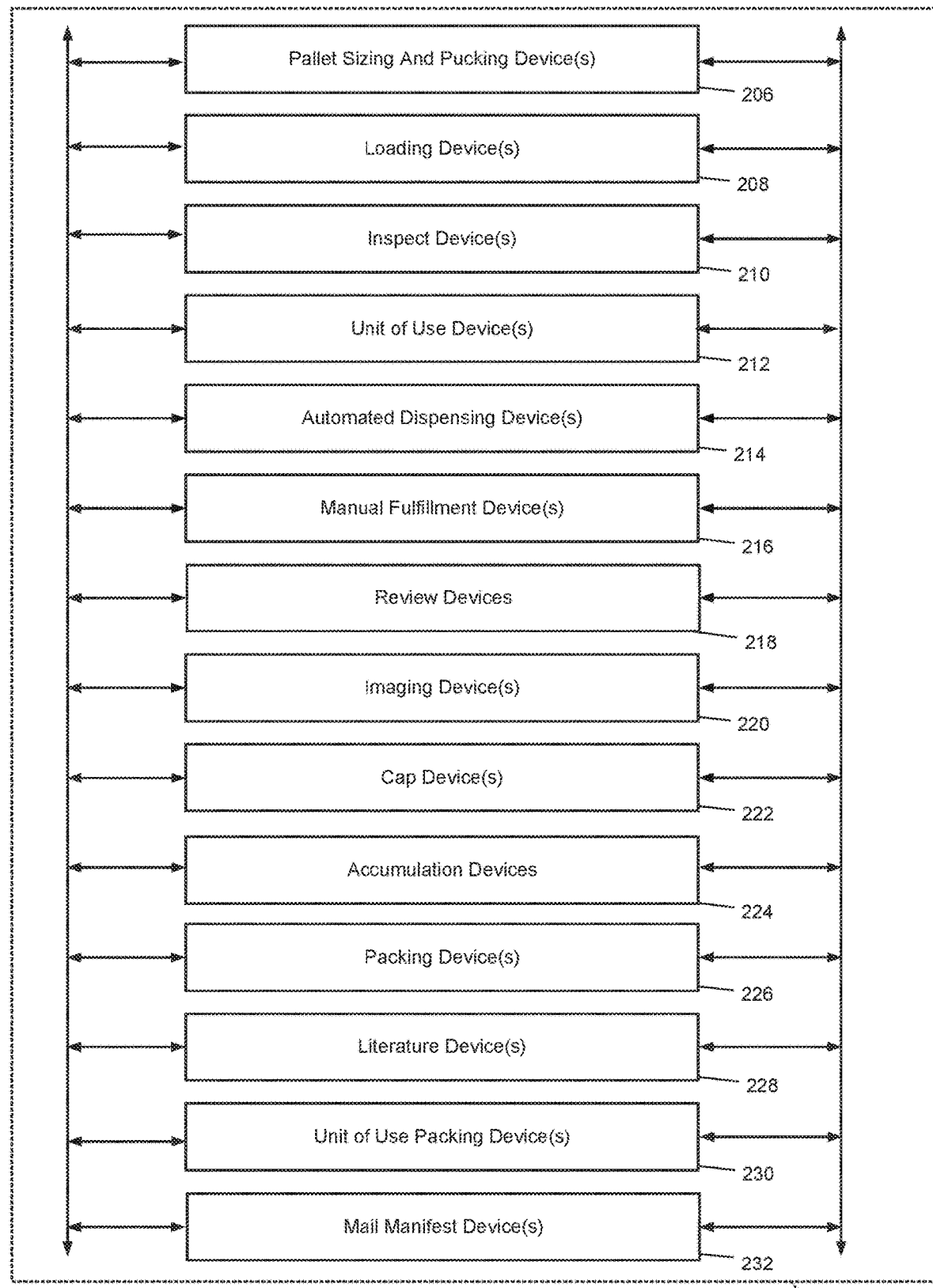
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

User Interface

Figure 4A:
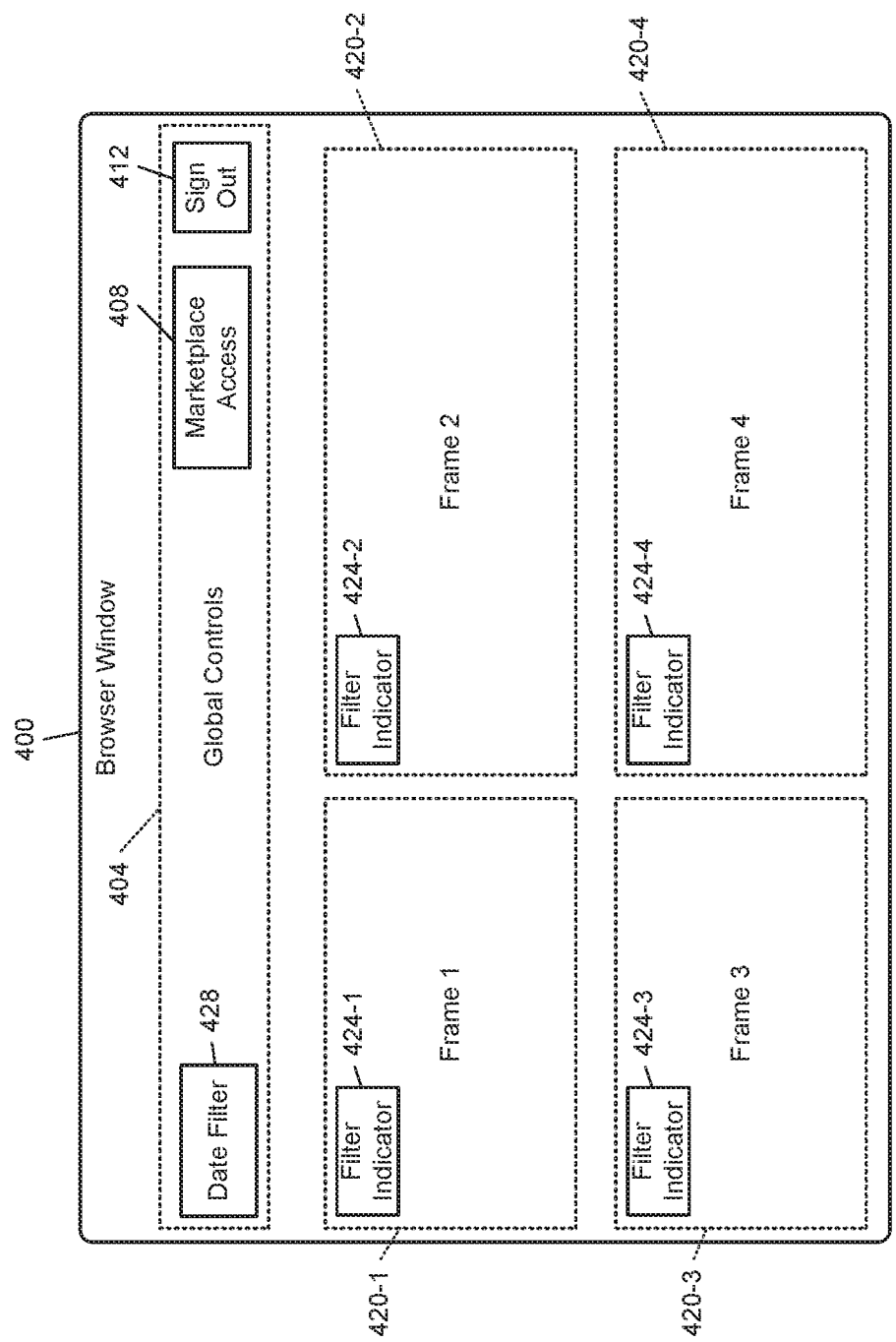
FIG. 4A is a graphical representation of an example user interface according to the principles of the present disclosure.

In FIG. 4A, an example simplified user interface (UI) is shown. In this example, a browser window 400 renders a parent page 404 (also referred to as a container page). Although the browser window 400 is shown in FIG. 4A and described below, the principles of the present disclosure are not limited to web browsing applications. First, an app may simply wrap the container page apps, allowing the container page to be displayed within what appears to be a mobile application. The mobile application can then be installed onto a tablet or smartphone from a digital distribution platform, such as a mobile phone application store or a desktop operating system application store. In other implementations, proprietary applications may be developed that load other websites into frames and coordinate communication between the frames. The proprietary application may rely on a browser rendering engine supplied by the underlying operating system, such as the WebKit web rendering platform.

The parent page 404 includes a marketplace access element 408, which allows the current user to select which frames will be displayed. The displayed frames may be arranged within a visible window or may extend beyond the visible window, where they can be accessed by scrolling the webpage horizontally and vertically and/or by using another window, such as on another physical display screen.

In the example of FIG. 4A, the present user has logged in and therefore a "Sign Out" UI element 412 is displayed. As described above, the user may sign in to the parent page 404, which may then authenticate the user to one or more of the frames. Therefore, selecting the "Sign Out" UI element 412 may log the user out of the individual frames as well.

For illustration only, first frame 420-1, second frame 420-2, third frame 420-3, and fourth frame 420-4 (collectively, frames 420) are shown. In various conditions, the number of the frames 420 may be controlled by the user and may be resized, sometimes within constraints, and rearranged within the parent page 404. In various implementations, the user may select only a single frame for display. The use may be permitted to define multiple layouts containing different frames or even the same frames arranged and sized differently. Additional user interface elements (not shown) may allow the user to switch between layouts and/or to modify the current layout, such as by tiling the frames 420 to fit within the visible portion of the parent page 404.

Each of the frames 420 includes a corresponding filter indicator 424-1, 424-2, 424-3, and 424-4 (collectively, filter indicators 424). The filter indicators 424 may be displayed by the corresponding frames, respectively, or may be overlaid on the frames 420 by the parent page 404.

The filter indicators 424 may remain invisible until a filter is present. For example, a date filter user interface (UI) element 428 may allow the user to apply a date filter to all of the frames 420. As described above, there may be no guarantee that all the frames 420 are able to respond to the date filter message. The filter indicators 424 may become visible when the date filter is applied and may indicate whether the date filter message was acted upon. For example, the filter indicators 424 may be rendered in solid black text to indicate that the filter is applied and may be rendered in dashed or gray text to indicate that the filter is not applicable.

In various implementations, the filter indicators 420 may include pictographic and/or text indications of applied and/or available filters. For example, colored icons may represent available filters, such as date, customer identifier, and drug name. These icons may be rendered in color for those frames 420 that are able to filter on those criteria and may be rendered in grayscale for those frames 420 not able to operate based on the filter.

As part of an onboarding process, the developer of a frame may indicate to the marketplace which filters are available. The parent page 404 may then use this information to render the filter indicators 424. In other implementations, filter availability may be communicated to the parent page 404 when each of the frames 420, respectively, loads into the parent page 404. In still other implementations, whether one of the frames 420 is able to implement a filter may be communicated back to the parent page 404 in response to a filter message. When the filter indicators 424 are rendered by the frames 420 themselves, feeding filter information back to the parent page 404 may be omitted.

In addition to showing that a particular filter is active, the filter indicators 424 may also indicate the filter properties, such as actual date range. This may not be redundant with the date range for the parent page 404. For example, when the date filter UI element 428 is actuated to select a range of dates, one or more of the frames 420 may be unable to filter with the same granularity specified by the date filter UI element 428. As an example only, the frame 420-3 may have weekly data and therefore may filter to show data for any weeks that have days encompassed within the date range from the date filter UI element 428. Meanwhile, the frame 420 4 may have week granularity but choose to include only weeks that are completely encompassed by the date range from the date filter UI element 428. Therefore, the filter indicators 424 display to the user what specific filter parameters are being rendered within the respective frames 420.

In various implementations, the filter indicators 424 may be overlaid by the parent page 404 and additional filter UI elements (not shown) may be rendered by some or all of the frames 420. When a filter is applied to an individual frame, those filter parameters may be communicated to the parent page 404 for broadcast to the other filters. In this way, data shown within the frames 420 is made consistent.

Figure 4B:
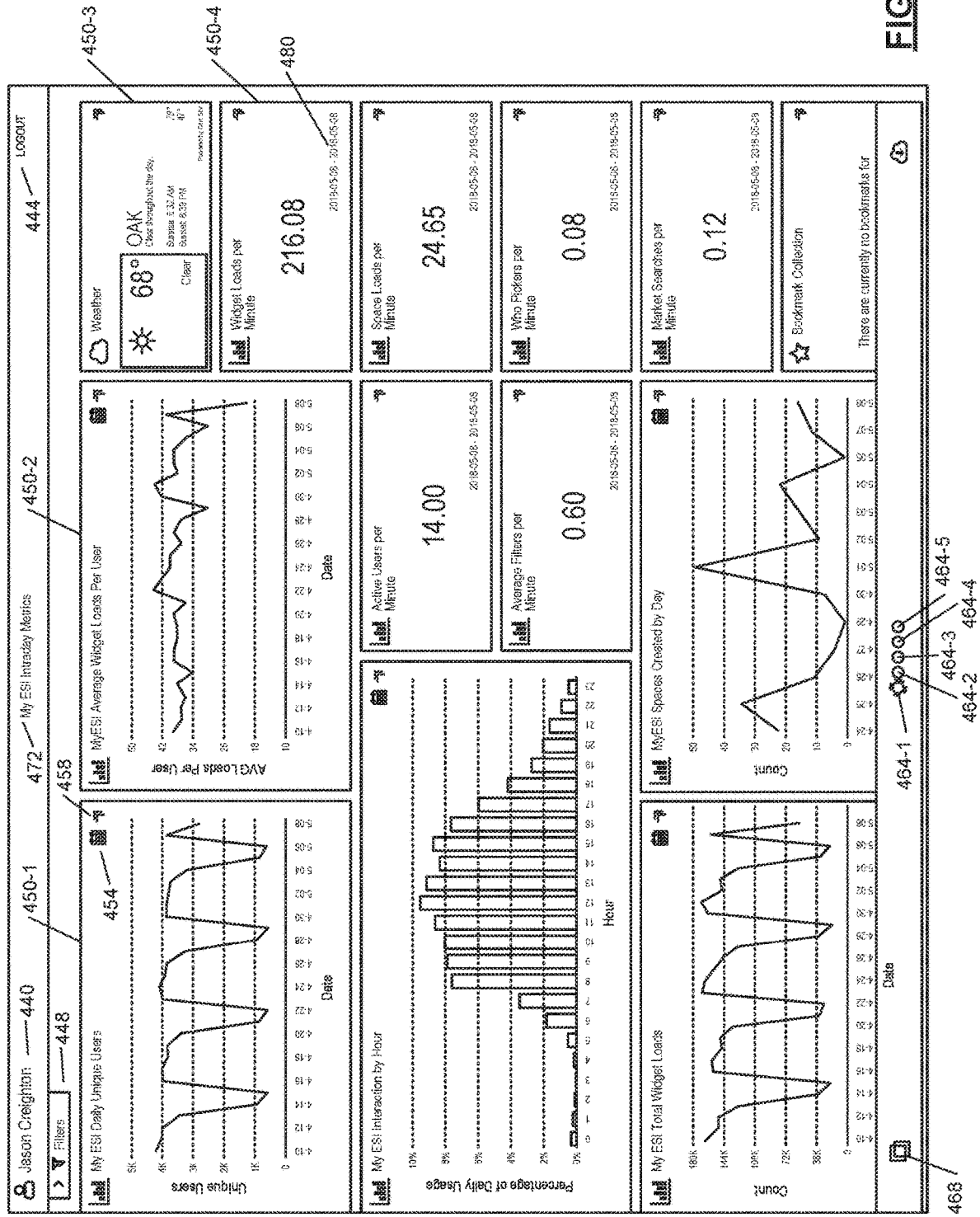
FIG. 4B is a graphical representation of another example user interface according to the principles of the present disclosure.

In FIG. 4B, another example UI is shown with example data and an example name ("My ESI", denoting Express Scripts, Inc.). A name 440 indicates the user logged in to the container page, and a logout button 444 allows the user to log out. Global filters can be applied across frames via a filters UI element 448. Frames 450-1, 450-2, etc. (also referred to as widgets) are displayed for purposes of illustration. Frame 450-1 is showing example data corresponding to daily unique users between April 10 and May 8. A calendar UI element 454 allows the user to adjust the time range. Upon adjusting the time range for the frame 450-1, the frame 450-1 may send a message to the container to update the rest of the frames to the same time period. An expansion UI element 458 allows the user to increase the size of the frame 450-1.

A set of space UI elements 464-1, 464-2, 464-3, 464-4, 464-5 (collectively, space UI elements 464) allow the user to select multiple different layouts of widgets. In FIG. 4B, the space UI element 464-1 is highlighted with a dashed circle to indicate its selection. Therefore, the widgets shown in FIG. 4B correspond to the first space. A name 472 ("My ESI Intraday Metrics") may be shown for the selected space. The name 472 may be specified by the user or may be predefined for a predetermined space.

To select another one of five spaces, the user can select a different one of the space UI elements 464. Each space may have a different set of widgets or a different arrangement of the same set of widgets. A space selection UI element 466 may allow the user to select spaces of interest to the user for selection by the space UI elements 464. For example, if the user selects an additional space, another space UI element 464-6 may be displayed.

Various spaces may be predefined for different roles, such as sales, marketing, legal, production, etc. to show a default set of widgets expected to be valuable for the corresponding role. In various implementations, the set of spaces visible to a user may be based on their position in an organizational chart. Certain spaces may be defined for different branches of the organizational chart, and certain other spaces may be defined based on how close to the root of the organizational chart the person is.

The frame 450-3 may obtain data from an application programming interface (API) of a weather service. The developer of the frame 450-3 may therefore create a limited widget (which may be referred to as a native widget) rather than a hosted web site to be shown in an iframe. For example, the developer of the frame 450-3 may specify how to retrieve the data (such as by providing a URL to the API) and specify a cascading style sheet (CSS) for rendering the data.

The frame 450-4 displays an average number of widget loads per minute for a certain time period. That time period is specified as a date range by a range indicator 480. In various implementations, clicking on the range indicator 480 may permit the user to select a different date range.

High-Level Block Diagram

Figure 5:
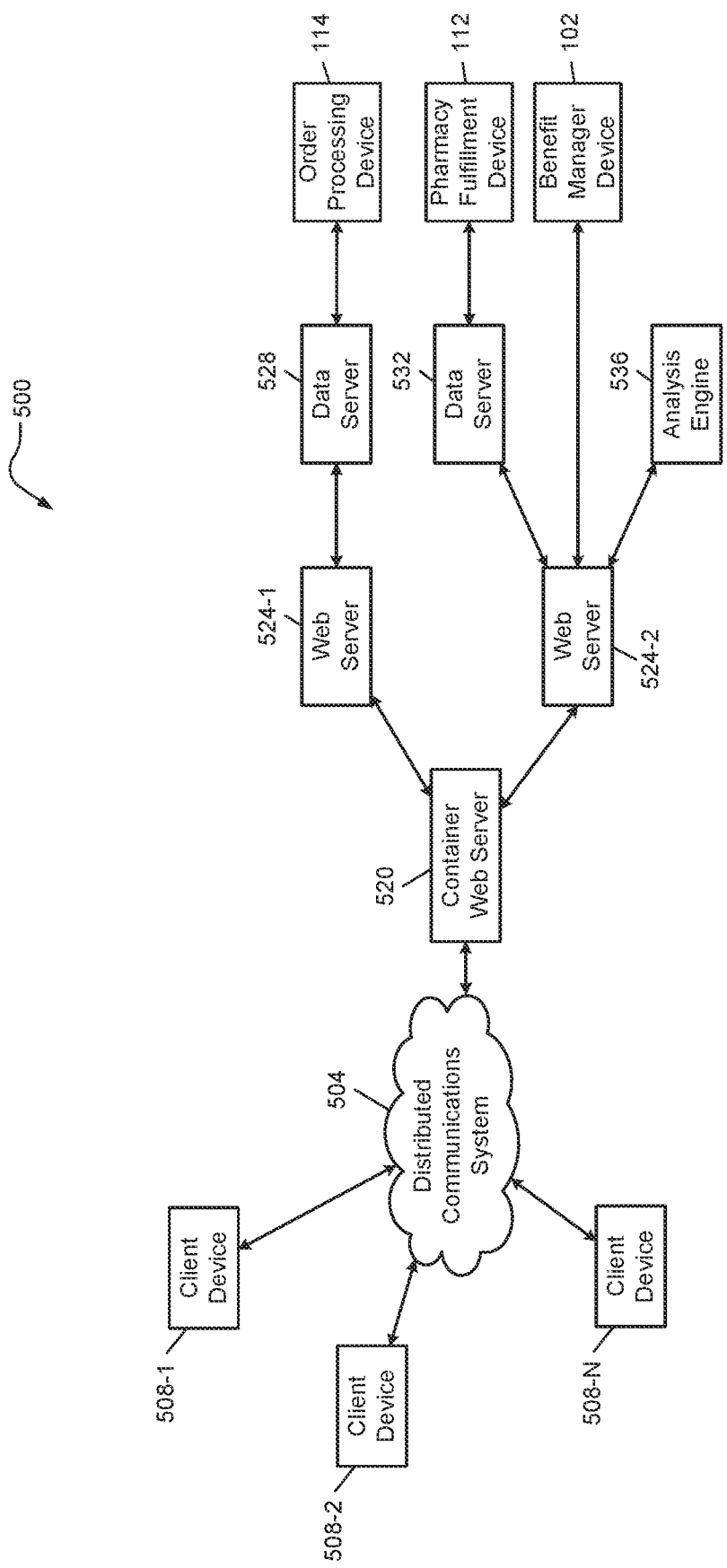
FIG. 5 is a high-level functional block diagram of various components of a distributed data system environment according to the principles of the present disclosure.

In FIG. 5, a functional block diagram of an example technical environment 500 in which the principles of the present disclosure can be applied is shown. A distributed communications system 504, which may overlap with or be the same as the network 104 in FIG. 1, allows client devices 508-1, 508-2 . . . 508-10 (collectively, client devices 508) to communicate with a container web server 520. The client devices 508 may be personal computing devices, such as laptops, desktops, phones, and tablets.

The container web server 520 loads frames from web servers 524-1 and 524-2 (collectively, web servers 524). The web servers 524 may communicate with the container web server 520 via the distributed communications system 504 but this physical communication is omitted in FIG. 5 for simplicity of illustration in favor of an indication of the logical connections between the web servers 524 and the container web server 520.

In various implementations, one or both of the web servers 524 may be co-located on a single hardware platform with each other and/or with the container web server 520. For example, in a virtualized environment, the web servers 524 and the container web server 520 may operate in virtual machines or containers on the same single physical server or across a distributed set of hardware resources. As is generally true for virtualization, this co-location may be transparent to and irrelevant to operation of the web servers 524 and the container web server 520.

The web server 524-1 may act as a web front-end for a data server 528, which interfaces with the order processing device 114. For example only, the data server 528 may be a structured query language (SQL) database server that receives data from the order processing device 114. The web server 524-1 may include backend code that passes SQL queries to the data server 528 and renders responses into hypertext markup language (HTML).

Continuing the example, the web server 524-2 may serve sites corresponding to another data server 532, the benefit manager device 102 of FIG. 1, and an analysis engine 536. The data server 532 may be another SQL server that obtains data from the pharmacy fulfillment device 112. In various locations, one or both of the data servers 528 and 532 may include the storage device 110 of FIG. 1.

The analysis engine 536 may include a business intelligence (BI) system, such as the Tableau BI software system. The analysis engine 536 may include data from various off-line reports that can be accessed via a web front-end in the web server 524-2. In this example, as an illustration only, the benefit manager device 102 may directly provide data to the web server 524-2.

The web servers 524 may each have separate access control lists and/or authentication requirements and may operate in different security domains. The container web server 520 therefore prevents direct communication between the web servers 524 but instead displays frames from each of the web servers 524 according to requests by users of the client devices 508.

Message Sequence Charts

Figure 6:
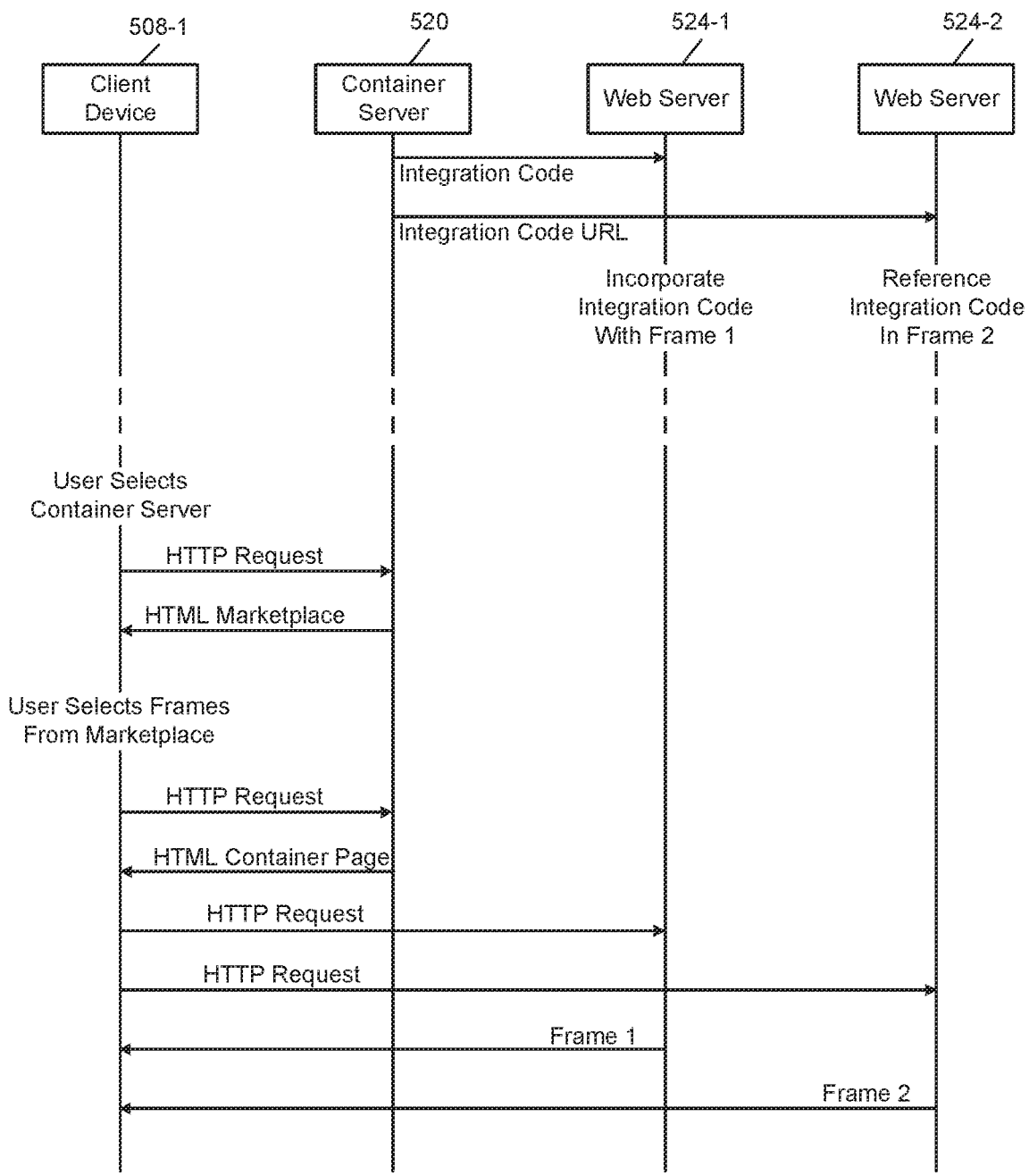
FIG. 6 is a message sequence chart showing example interaction between web servers in response to a user access.

In FIG. 6, the container server 520 is shown providing integration code (also referred to as integration code) to the web server 524-1. For example, the integration code may include source code, such as JavaScript code, or object code. The web server 524-1 can then incorporate the integration code with a webpage referred to as "Frame 1." The term Frame 1 simply refers to the fact that this page will be loaded into a first location: the developer of the webpage would not be able to predict whether and in what order the website would be loaded into the container server 520.

In another example, the web server 524-2 is shown receiving a uniform resource locator (URL) that points to integration code. In this way, a developer using the web server 524-2 can reference the integration code using the URL when preparing a website for use with the container server 520. In various implementations, the integration code may be hosted on a physically or logically separate platform from the container server 520. As one example only, the integration code may be hosted on a source code repository system, such as the public GitHub source code repository or a private GitHub source code repository.

The developer of the first frame and the developer of the second frame, which might be the same developer, interact with a marketplace, which may be hosted on the container server 520. The marketplace may include a database of available websites for loading as frames. This database may include information about the websites, including the URL from which the website can be accessed, access control information, and information about which filter operations are recognized by the web sites.

At some later time, indicated by dashes in FIG. 6 (which means that any period of time may have passed, from seconds to months or even years), the user of the client device 508-1 accesses the container server 520. For example, the user may select a bookmark or click a link directed to the container server 520. In response to this selection, a web browser or other HTML, rendering engine sends a hypertext transfer protocol (HTTP) request to the container server 520. The container server 520 may authenticate (not shown) the user and, if the user has not yet selected a set of frames for display, the container server 520 may respond with HTML for a marketplace portal. In various implementations, the container server 520 may redirect the browser of the client device 508-1 to a separate server on which the marketplace is stored.

The user selects frames of interest from the marketplace, which may entail a number of communications (not shown for brevity) between the client device 508-1 and the container server 520. For example, checkboxes corresponding to the various frames may be shown, and an HTTP POST method may be used to submit the identity of the checkboxes to the container server 520. Once the selection of frames is complete, the marketplace may redirect the user to the default page of the container server 520. This is shown in FIG. 6 as another HTTP request to the container server 520.

Now that the user has been authenticated and a set of frames has been selected, the container server 520 responds to the client device 508-1 with an HTML container page. Once the HTML container page is received by the client device 508-1, inline frame (iframe) operators in the HTML container page may cause the client device 508-1 to make HTTP requests to the web server 524-1 and to the web server 524-2.

The web server 524-1 authenticates the user, which may include obtaining an authentication token from the client device 508-1, and responds with the first frame. Similarly, in response to the HTTP request, the web server 524-2 responds with the second frame. In various implementations, the second frame may initially display an authentication workflow, allowing the user to authenticate within the second frame to the web server 524-2. For example, a username, password, and optionally a second factor (such as a code that is displayed in an authenticator app or received via phone or text message) may be solicited.

Figure 7A:
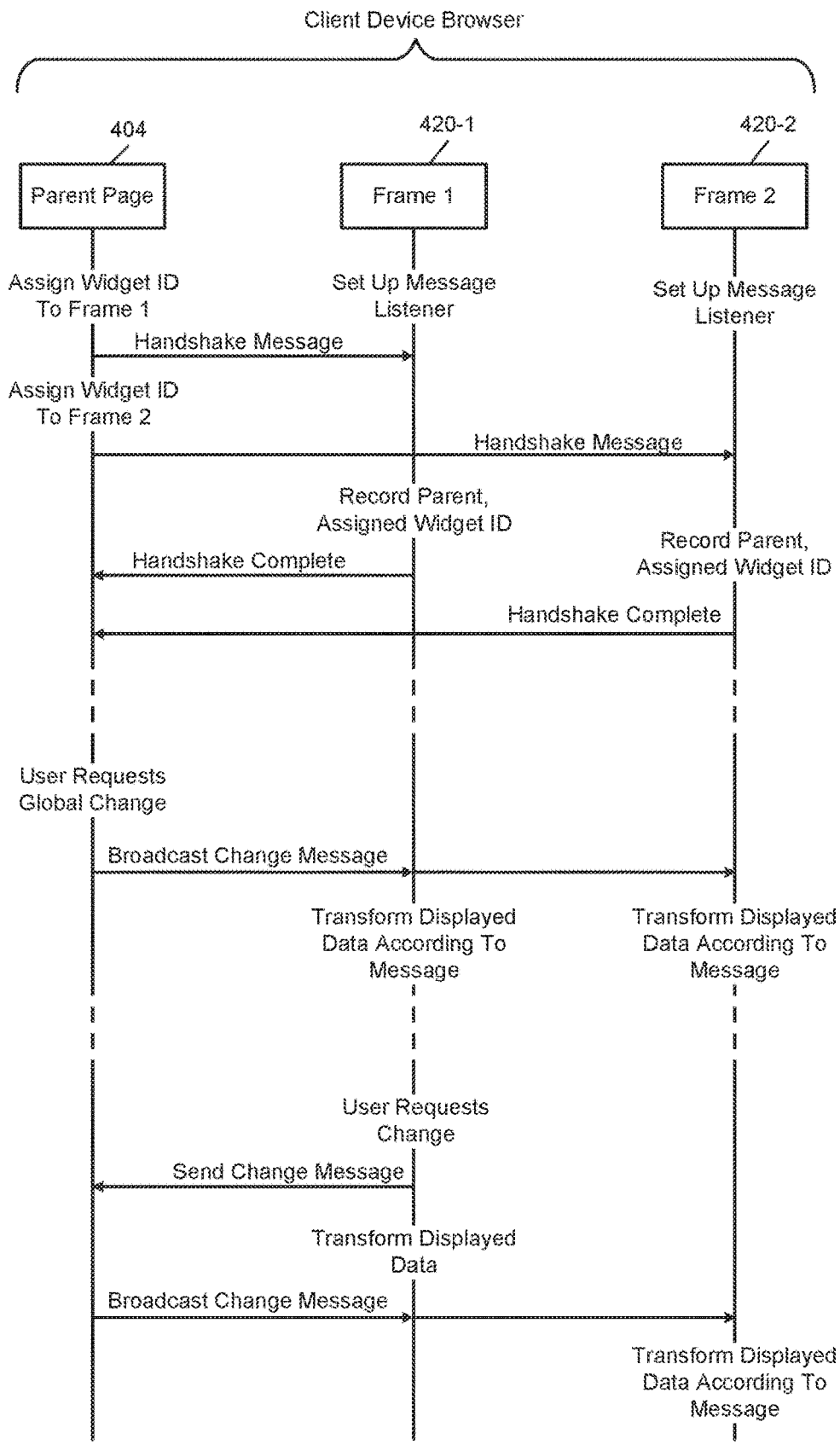
FIG. 7A is a message sequence chart showing handshakes and filter message exchange between frames.

In FIG. 7A, operation of the parent page 404 when loading the frames 420 includes assigning a unique widget identifier (ID) to first frame 420-1 and another unique widget ID to second frame 420-2. Meanwhile, as the frames 420-1 and 420-2 are loaded, each sets up a respective message listener to listen for messages from the parent page 404.

The parent page 404 sends a handshake message to the first frame 420-1. The handshake message includes the widget ID specifically assigned to the first frame 420-1 and may also include an identifier of the parent page 404 so that messages can be directed back to the parent page 404. Similarly, the parent page 404 sends a handshake message including the corresponding assigned widget ID to the second frame 420-2.

When the message listener in the integration code of the first frame receives the handshake message, the integration code records the identity of the parent as well as the assigned widget ID and transmits back a handshake complete message to the parent page 404 using the recorded parent identifier. Similarly, the second frame 420-2 records the identity of the parent as well as the assigned widget ID and transmits a handshake complete message to the parent page 404. As the frames 420-1 and 420-2 load, graphical content is displayed to the user. In addition, though not shown, one or both of the frames 420-1 and may carry out an authentication process for the user.

In the example of FIG. 7A, the user may request a global change, such as a filter by date. This may be accomplished using the date filter UI element 428 shown in FIG. 4A. In response to the request for the global change, the parent page 404 broadcasts a change message to the frames 420-1 and 420-2. Each of the frames 420-1 and 420-2 receives the message and, if supported, transforms the display data according to the message.

At a later time in this example, the user requests a change within the first frame 420-1. The first frame 420-1 may implement that change and then send a change message to the parent page 404. For example, the first frame 420-1 may transform display data according to a selection of another filter, such as geography. The parent page 404 then broadcasts the change message to the frames 420-1 and 420-2. In response, the frame 420-2 may, if supported, transform data displayed to the user according to the message.

Continuing the example shown in FIG. 7A, the first frame 420-1 may identify data of interest. For example, the user may select a particular drug displayed within the first frame 420-1. The first frame 420-1 transmits the data request to the parent page 404, which then broadcasts the data request to the frames 420-1 and 420-2. In the event that the second frame 420-2 is able to respond to the data request, the second frame 420-2 sends a data response to the parent page 404. The parent page 404 may maintain a table of requested data and forward the data response to the first frame 420-1 to satisfy the data request. The first frame 420-1 may then transform the display according to the forwarded data. For example, the forwarded data may include a list of generic drugs substituting for a selected branded drug.

Figure 7B:
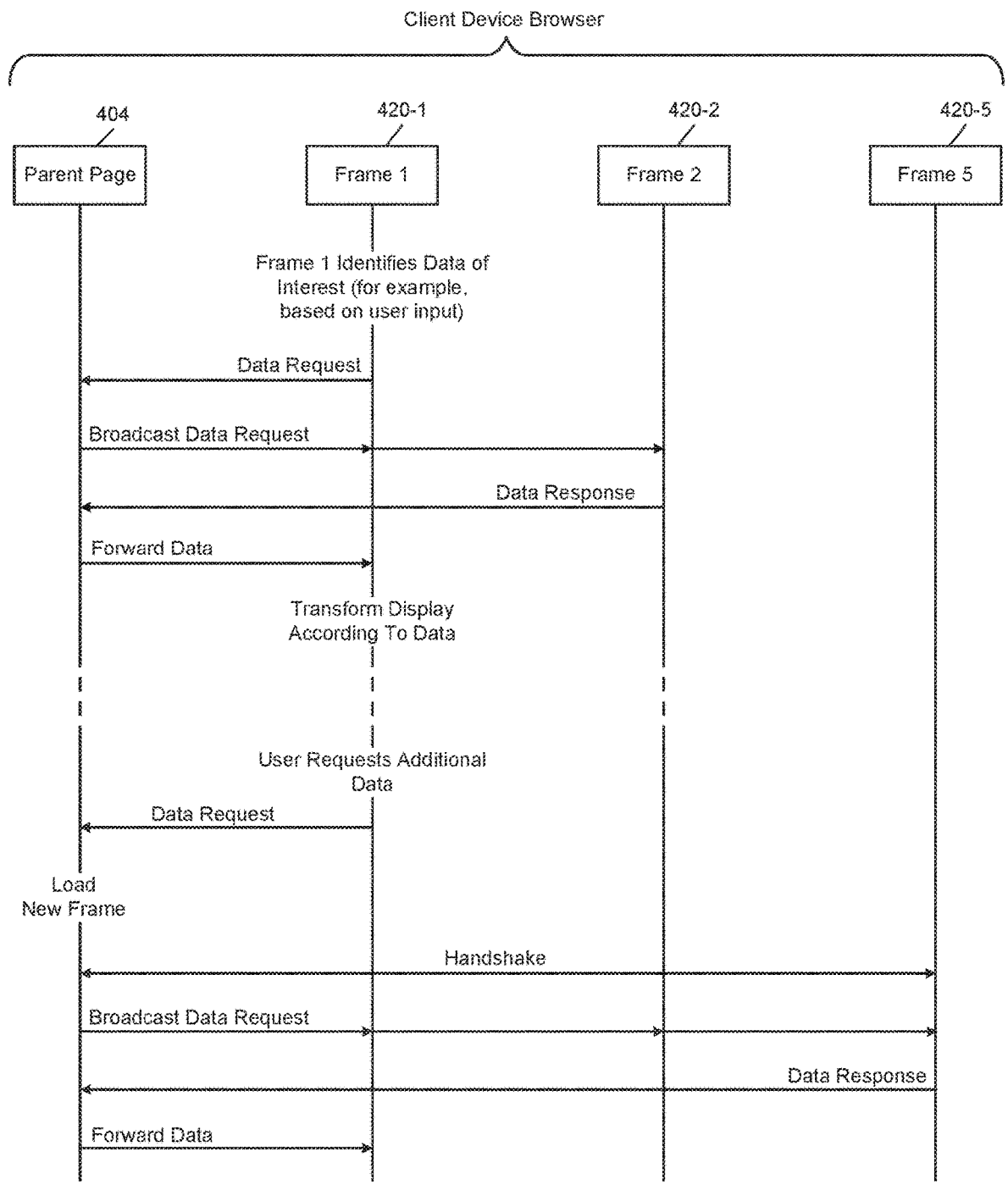
FIG. 7B is a message sequence chart showing data exchange between frames.

At some later time in the example of FIG. 7B, the user may request additional data within the first frame 420-1. This causes the first frame 420-1 to send the data request to the parent page 404. In response to the data request, the parent page 404 may recognize that a new frame is needed. This new frame is then loaded, though it may not be displayed to the user depending on the architecture and settings of the parent page 404. In this case, the frame is referred to as a fifth frame 420-5.

The parent page 404 conducts a handshake with the fifth frame 420-5. Once the handshake is complete, the parent page 404 broadcasts a data request to the frames 420. The fifth frame 420-5 may include the requested data and therefore responds to the parent page 404 with a data response. The parent page 404 then forwards this response to the original requester, the first frame 420-1. The examples shown in FIGS. 7A and 7B are not limiting and are not required. For example, there may be no requirement that data requests be implemented by the frames 420 or the parent page 404.

Block Diagrams

Figure 8:
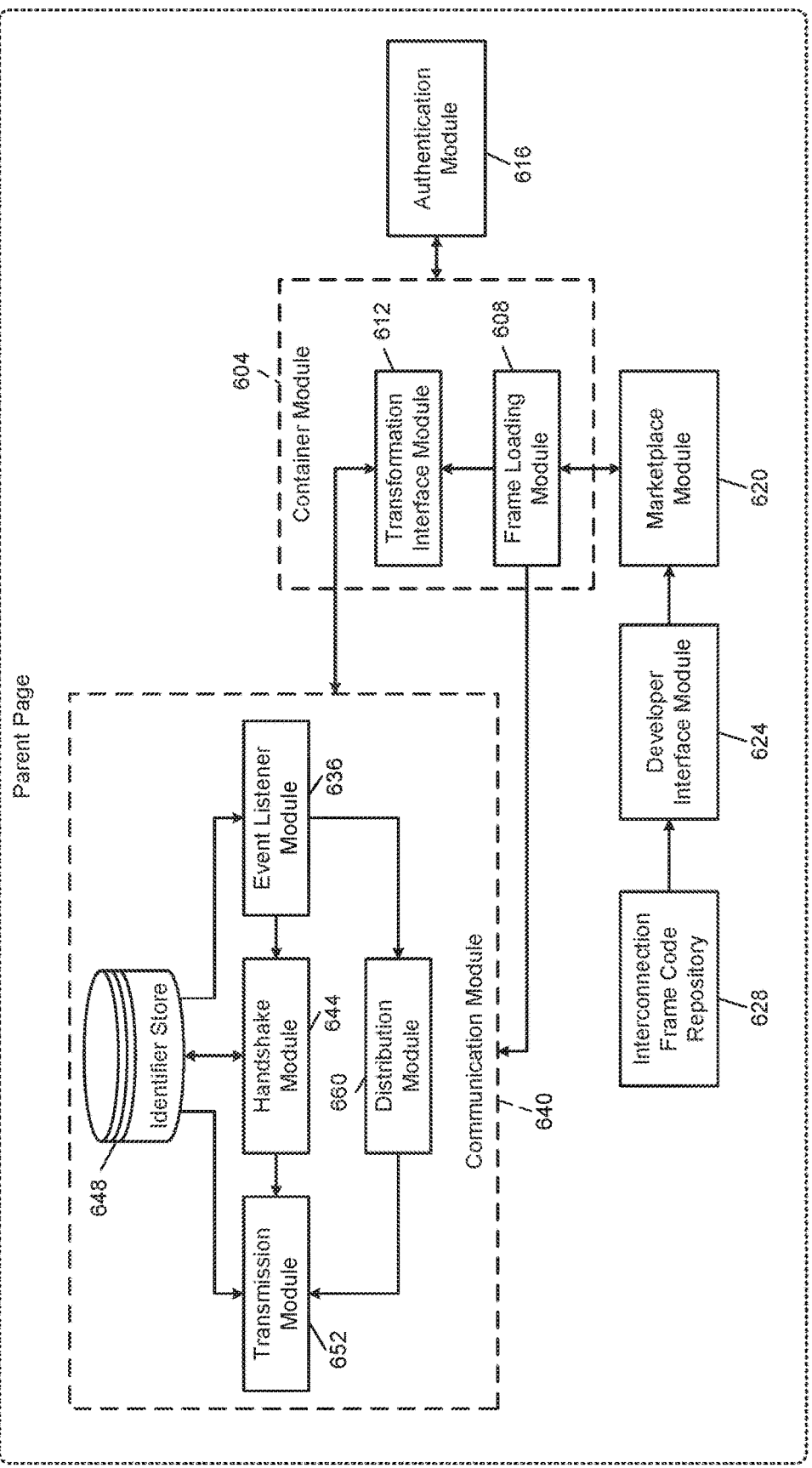
FIG. 8 is a functional block diagram of an example implementation of a container page.

In FIG. 8, an example partial implementation of the parent page 404 includes a container module 604 that includes a frame loading module 608 and a transformation interface module 612. The frame loading module 608 is responsible for loading user-specified frames. The transformation interface module 612 is responsible for displaying user interface (UI) elements relating to transforming the display frames. For example, the UI elements may include filtering inputs allowing filters, such as date ranges, to be specified.

An authentication module 616 controls whether a user is permitted to access the parent page 404. Once the user is authenticated, the set of frames to be loaded may be obtained from a marketplace module 620. The marketplace module 620 may include a data store indicating a set of frames that have been specified for each user.

As discussed above, each user may be associated with multiple layouts, so the data store in the marketplace module 620 may include an identification of a set of frames as well as arrangement and sizing of the frames for each of the layouts for the user. The marketplace module 620 may also be configured to present a user interface allowing users to select frames for one or more layouts. The marketplace module 620 may receive information about available frames from a developer interface module 624.

The developer interface module 624 may include its own authentication system to authenticate developers of frames. The developer interface module 624 may obtain metadata for the frames, such as locations (URLs), descriptive matter (such as a short name and a long textual description) of the frames, and a set of tags (such as supported filters). The developer interface module 624 may also supply information about the developer to the marketplace module 620. Then, when a user is accessing marketplace module 620, the user can specify certain developers of interest and/or limit the displayed applications to those applications that support a particular filter, such as date.

An integration code repository 628 may store integration code for use in frames developed by developers. The integration code may be supplied to a developer through the developer interface module 624. In other implementations, the integration code may simply be hosted and referenced by the developer. As described above, the integration code may be hosted by or supplied by a different component than the parent page 404. In addition, the developer interface module 624 may be implemented in a different location, such as in a developer portal that may be hosted in a different location from the parent page 404.

The frame loading module 608 may indicate to a communication module 640 that a frame is being loaded. A handshake module 644 of the communication module 640 can then transmit a handshake message to the newly-loaded frame. The handshake message includes an identifier assigned to the frame and stored in an identifier store 648. Transmission of the handshake message may be performed by a transmission module 652, which transmits messages to frames based on their assigned identifiers from the identifier store 648.

An event listener module 656 listens for messages sent by loaded frames. For example, one type of message received is a handshake complete message, which is provided to the handshake module 644. Once the handshake module 644 determines that the handshake is complete, a field may be set in the identifier store 648 corresponding to that frame.

When a non-handshake message is received, the event listener module 656 may route that message to a distribution module 660. The distribution module 660 may determine whether the message is intended to be broadcast (which may be indicated by the received message) and, if so, provides the message to the transmission module 652 for broadcasting to all frames. For example only, the transmission module 652 may broadcast messages only to those frames that have completed a handshake as recorded by the identifier store 648.

Figure 9:
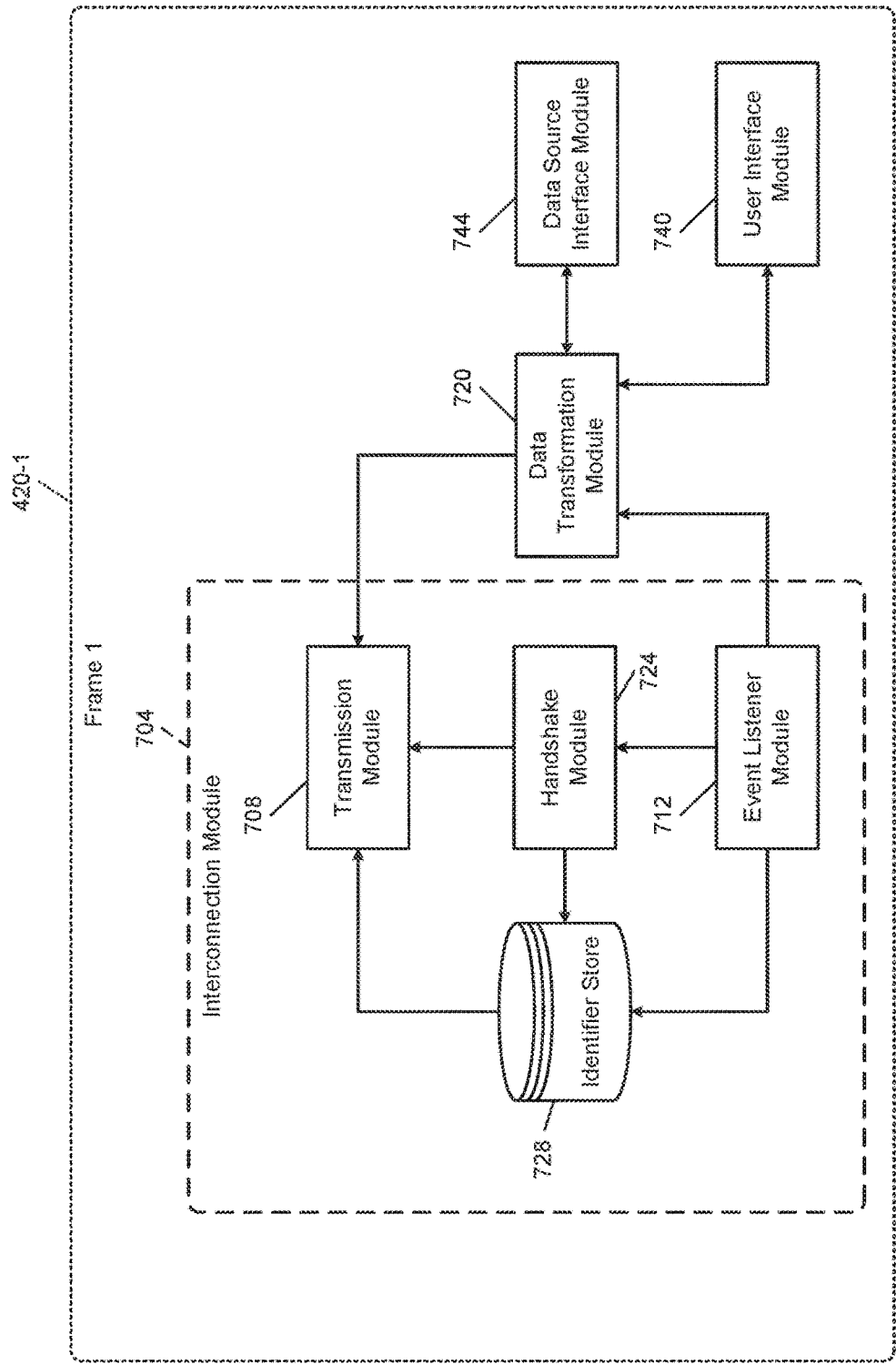
FIG. 9 is a functional block diagram of an example implementation of a frame according to the principles of the present disclosure.

In FIG. 9, an example implementation of the first frame 420-1 is presented in functional form. An interconnection module 704 may have been obtained from the container server 520 and may be referred to or be part of the integration code described in FIG. 6. In other words, the first frame 420-1 may treat the interconnection module 704 as a black box with a defined application programming interface (API) that allows communication with the parent page 404 and potentially other frames.

Messages to be transmitted are provided to a transmission module 708 of the interconnection module 704. Similarly, messages received by the interconnection module 704 are handled by an event listener module 712 and output from the interconnection module 704. In the example of FIG. 9, a data transformation module 720 is the only component that provides messages to the transmission module 708 and receives messages from the event listener module 712. In various implementations, additional modules may generate messages for transmission and may handle incoming messages.

For example, the event listener module 712 may be implemented at the time of loading the first frame 420-1 as shown here:

```
window.onload = function ( ) {
  MyESI_setupParentListener( );
}
function MyESI_setupParentListener( ) {
  var eventMethod = window.addEventListener ? "addEventListener" ;
```

-continued

```
"attachEvent";
  var eventer = window(eventMethod);
  var messageEvent = eventMethod == "attachEvent" ? "onmessage" ;
"message"
  eventer(messageEvent,function(e) {
    var event = null;
    try {
      event = new Event("Message"+e.data.MessageType);
    } catch(error) {
      event = document.creatEvent("Event");
      event.initEvent("Message"+e.data.MessageType, false
false);
    }
    if (event == null) return;
    event.data = e.data;
    window.dispatchEvent (event);
  },false);
```

A handshake module 724 of the interconnection module 704 receives handshake messages from the event listener module 712 and records received IDs in an identifier store 728. For example, the parent page 404 may provide an assigned identifier to the interconnection module 704 which the transmission module 708 then uses as a source address for messages sent back to the parent page 404. The handshake module 724 may also be responsible for sending a handshake complete message to the parent page 404 via the transmission module 708. The transmission module 708 may need to know the identity of the parent page 404 in order to successfully transmit a message to the parent page 404. This may be obtained from the handshake message and stored in the identifier store 728.

For example, the handshake module 724 may be partially implemented as follows:

```
function MyESI_AddListener(MessageType, actionFn) {
  window.addEventListener("Message"+MessageType, actionFn) ;
}
MyESI_AddListener("Handshake",function(e) {
  if (MYESIWIDGETASSIGNMENT == 0) {
    MYESIPARENTORIGIN = e.data.parentOrigin;
    MYESIWIDGETASSIGNMENT = e.data.WidgetAssignmentId;
  MyESI_SendMessageToMyESI ("HandshakeComplete",
    {"Announce":false) );}
});
```

A user interface module 740 may format data for display and receive user input, such as filter commands. The data transformation module 720 may apply the filter to the data, at which time the user interface module 740 may then format the filter data for presentation to the user. The data transformation module 720 may also transmit that filter message to the parent page 404 via the transmission module 708.

Data for display may be received from a data source interface module 744 which may provide an interface between the data transformation module 720 and a SQL server or other provider of data. In various implementations, the data transformation module 720 may not itself perform filtering but instead request that the data source interface module 744 obtain filter data. As one example, the data source interface module 744 may construct a SQL query corresponding to the desired filter.

Flowcharts

Figure 10:
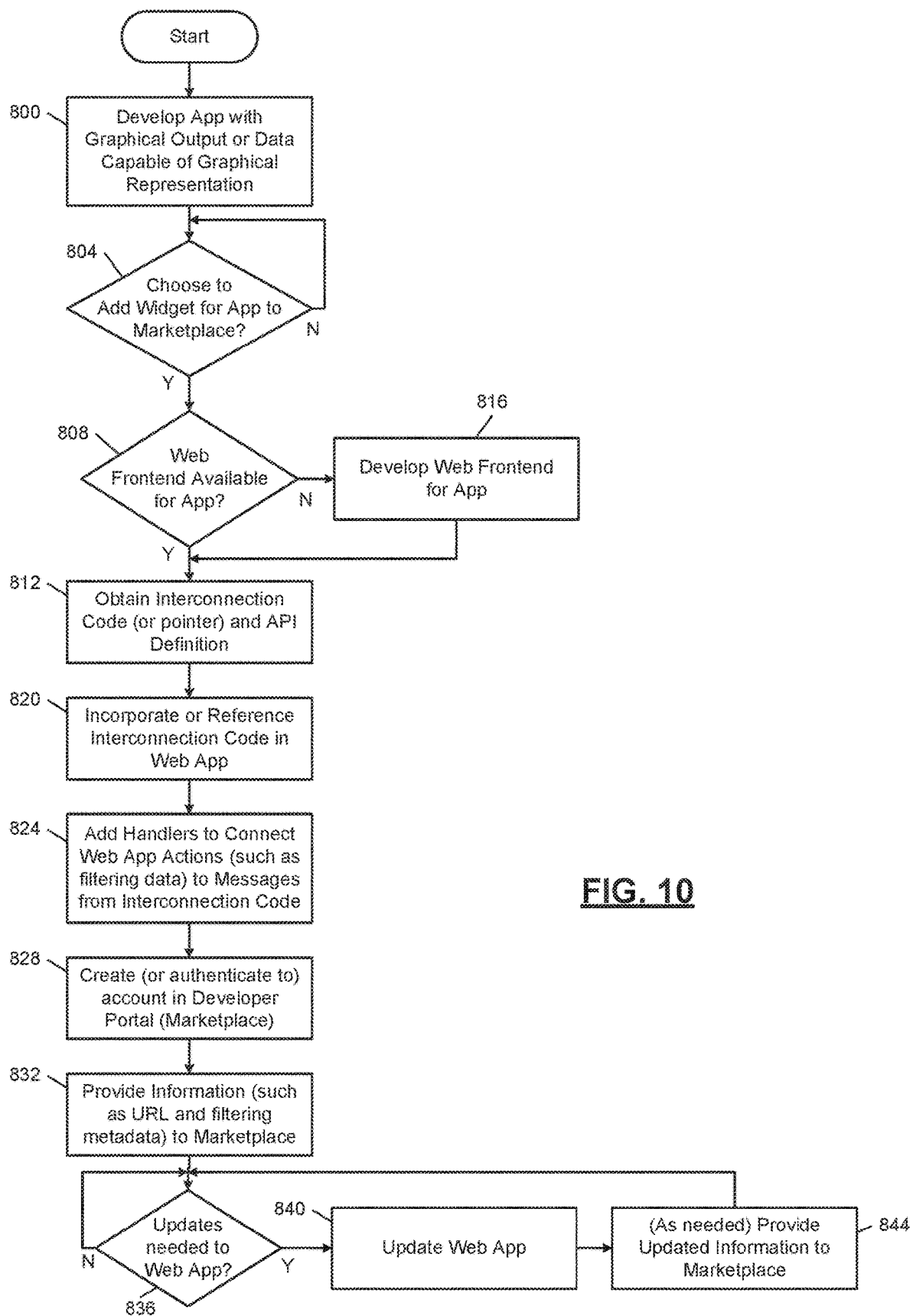
FIG. 10 is a flowchart of example operation by a developer consistent with the principles of the present disclosure.

In FIG. 10, example operation performed by a developer of a frame according to the principles of the present disclosure begins at 800. At 800, the developer (or another developer, such as the developer's predecessor) develops an application with graphical output or data capable of graphical representation. For example, a set of values can be displayed in a list format or a metric observed over time can be plotted as a bar chart, line chart, etc.

At 804, the developer chooses whether to add a widget for the app to the marketplace. If so, control transfers to 808; otherwise, control remains at 804. If the developer decides not to add a widget, control does not continue, at least with respect to the framework of the present disclosure.

At 808, the developer determines whether a web front-end is available for the app. If so, control transfers to 812; otherwise, control transfers to 816. At 816, developer develops a web front-end for the app or data source. Control then continues at 812. Note that the developer of the web front-end may be different from the developer of the original app. In fact, the original app or data source may be historical, with no developers who currently work with the app or data source-in fact, most developers may no longer even be fluent in the language used by the original app. As long as input can be passed to the app and output can be converted into HTML, the web front-end can be developed.

At 812, the developer obtains the integration code (or pointer to the code's location) and an API definition allowing for interaction with the integration code. At 820, control incorporates the integration code into the web front-end. Or, when the integration code is hosted elsewhere, a reference to the integration code is included. At 824, control adds handlers to the web front-end to connect actions, such as filtering data, to messages received by the integration code. These handlers allow the web front-end to respond to messages from the parent page.

At 828, the developer creates or authenticates to an account in the developer marketplace or a developer portal. At 832, control provides information, such as an access URL and metadata, to the marketplace. At 836, if any updates are needed to the web app, control transfers to 840; otherwise, control remains at 836. At 840, the developer updates the web app. At 844, the developer may provide updated information to the marketplace, such as a new URL or revised information about what filtering operations are supported. Control then returns to 836.

Figure 11:
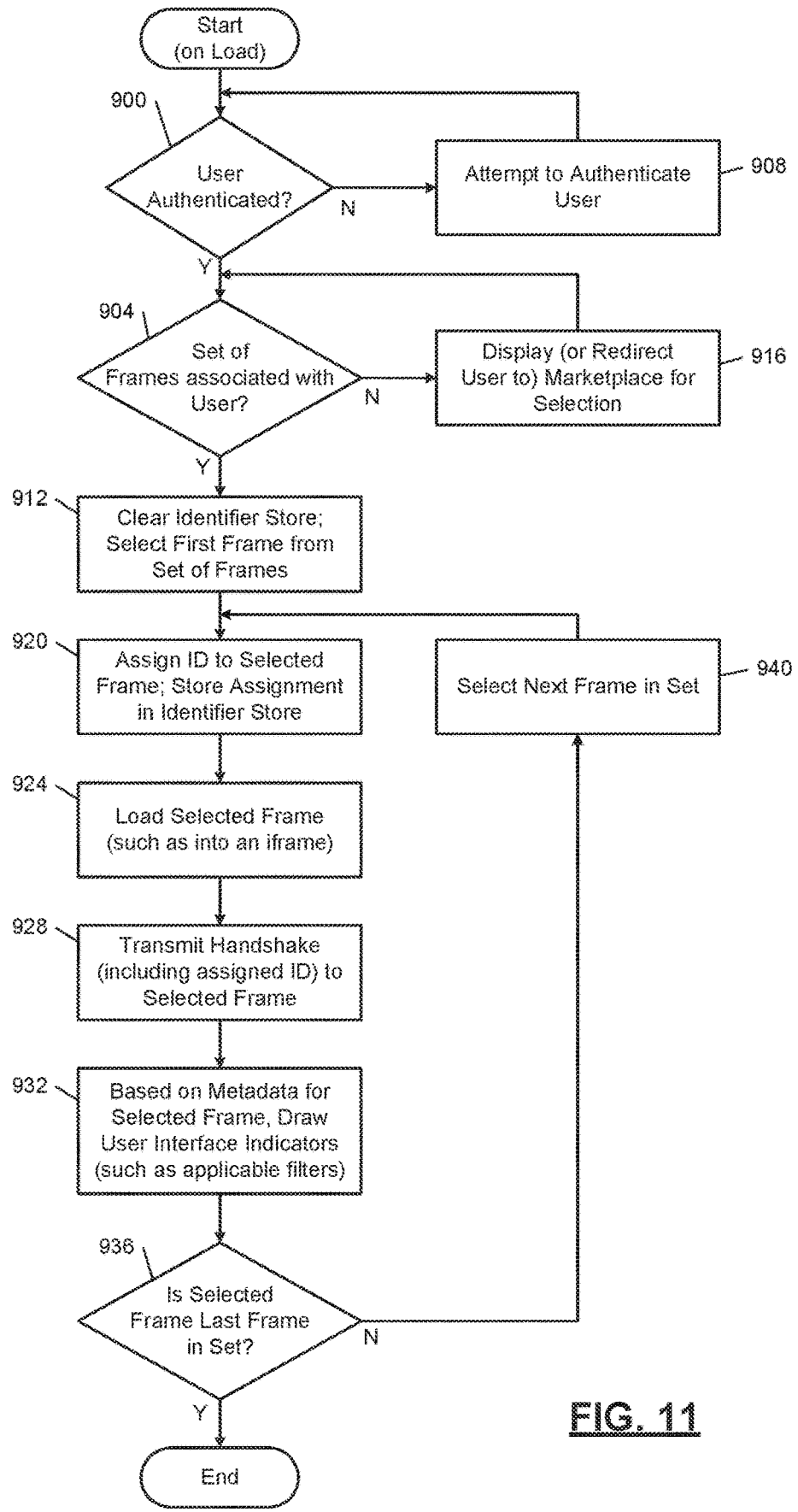
FIG. 11 is a flowchart of example operation of page load processing by a container.

In FIG. 11, example operation of the container server at load time begins at 900. Control determines whether a user is authenticated to the container server. If so, control continues at 904; otherwise, control transfers to 908. At 908, control attempts to authenticate a user and returns to 900. At 904, control determines whether a set of frames is associated with the user. If so, control continues at 912; otherwise, control transfers to 916. At 916, control displays, or redirects the user to, a marketplace for selection of frames of interest. Control then returns to 904.

At 912, control clears an identifier store data structure and selects a first frame from the associated set of frames for the user. In an implementation where the user can specify multiple layouts, the desired layout may first be obtained from the user before identifying a set of frames. At 920, control assigns a unique ID to the selected frame and stores that assignment in the identifier store. At 924, control loads the selected frame, such as into an inline frame (iframe) HTML, object.

At 928, control transmits a handshake message, including the assigned ID, to the selected frame. At 932, based on metadata for the selected frame, control draws user interface indicators, such as applicable filters, onto or next to the frame. At 936, if the selected frame is the last frame in the set, control ends; otherwise, control transfers to 940. At 940, control selects the next frame in the set and transfers to 920.

Figure 12:
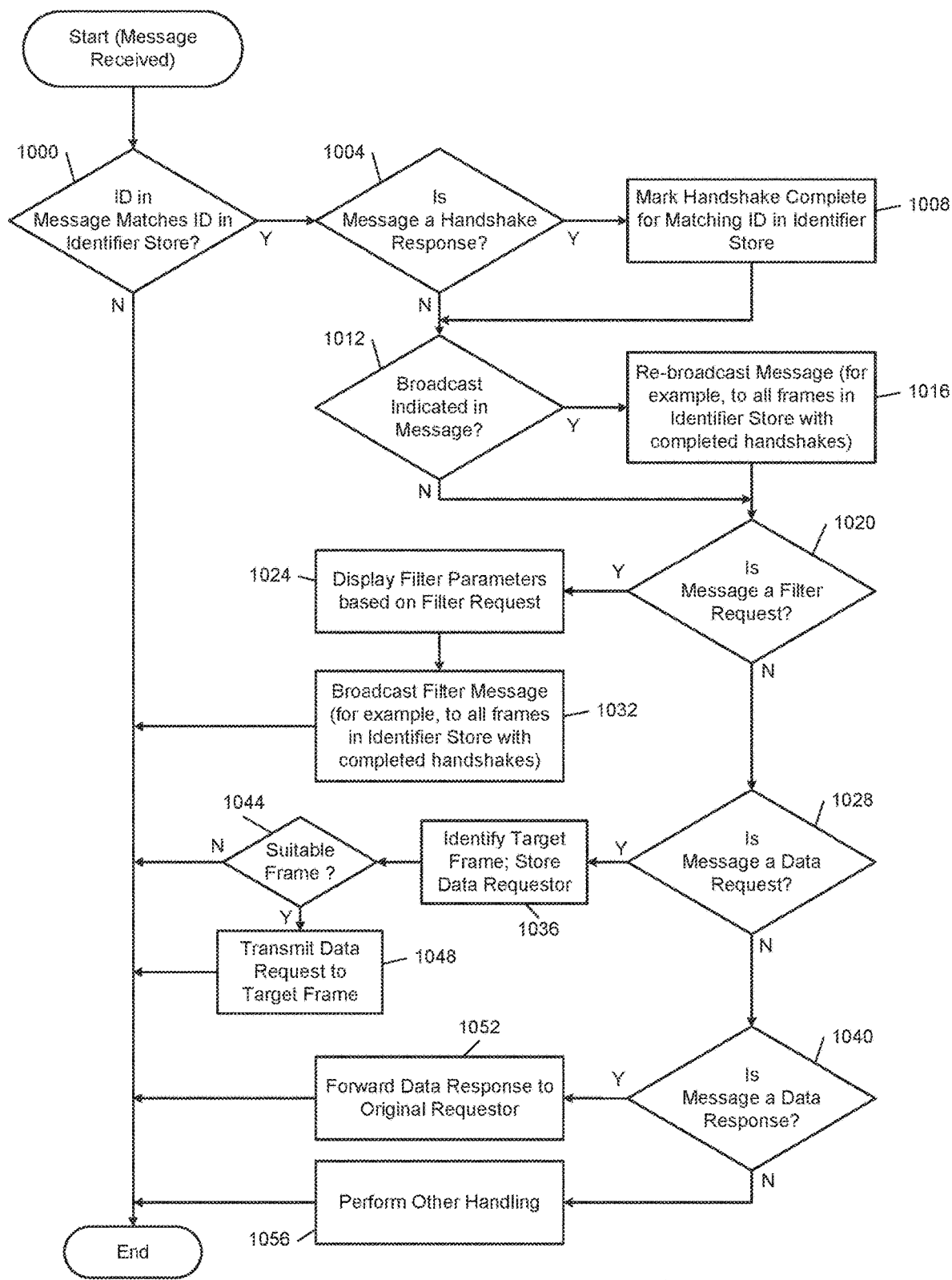
FIG. 12 is a flowchart of example message receipt processing by the container.

In FIG. 12, control for message handling by the container begins at 1000 when a message is received. At 1000, control determines whether the source ID specified in the message matches an ID in the identifier store. If so, control transfers to 1004; otherwise, control ends. When control ends, control may also perform error handling, such as logging the non-matching ID and/or transmitting an error code back to a source of the message. At 1004, control determines whether the message is a handshake response. If so, control transfers to 1008; otherwise, control transfers to 1012. At 1008, control marks the handshake complete for the matching ID in the identifier store. Control then continues at 1012.

At 1012, control determines whether the message indicates that it should be broadcast. For example, this may be a binary field included in each message. If the message indicates that broadcast is desired, control transfers to 1016; otherwise, control transfers to 1020. At 1016, control rebroadcasts the message, such as to all frames that have completed handshakes according to the identifier store.

At 1020, control determines whether the message is a filter request. If so, control transfers to 1024; otherwise, control transfers to 1028. At 1024, control displays filter parameters based on the filter request. Control continues at 1032 where the filter message is broadcast. In other words, the filter message may be broadcast even if the message itself did not request a broadcast. Control then ends.

At 1028, control determines whether the message is a data request. If so, control transfers to 1036; otherwise, control transfers to 1040. At 1036, control identifies a target frame that may be able to satisfy the data request. If, at 1044, a suitable frame has been identified, control transfers to 1048. Otherwise, a suitable frame has not been identified and control may end or, in some implementations, attempt to load a frame that may be able to satisfy the data request. At 1048, control transmits a data request of the target frame and ends. In various implementations, the data request may be broadcast to all frames, not just to one or more target frames that may be configured to provide the data.

At 1040, control determines whether the message is a data response. If so, control transfers to 1052; otherwise, control transfers to 1056. At 1052, control forwards the data response to the original requester. For example, a data request ID may be assigned to a data request and included when transmitting the data request to target frames. Therefore, the data response can reference this data request ID so that the container can match the data response to an original requester. Control then ends. At 1056, control performs other handling based on the message type. For example, if the message type is not identified, the message may be logged for later analysis and error handling may be performed, such as transmitting an error message back to the sender. Control then ends.

Figure 13:
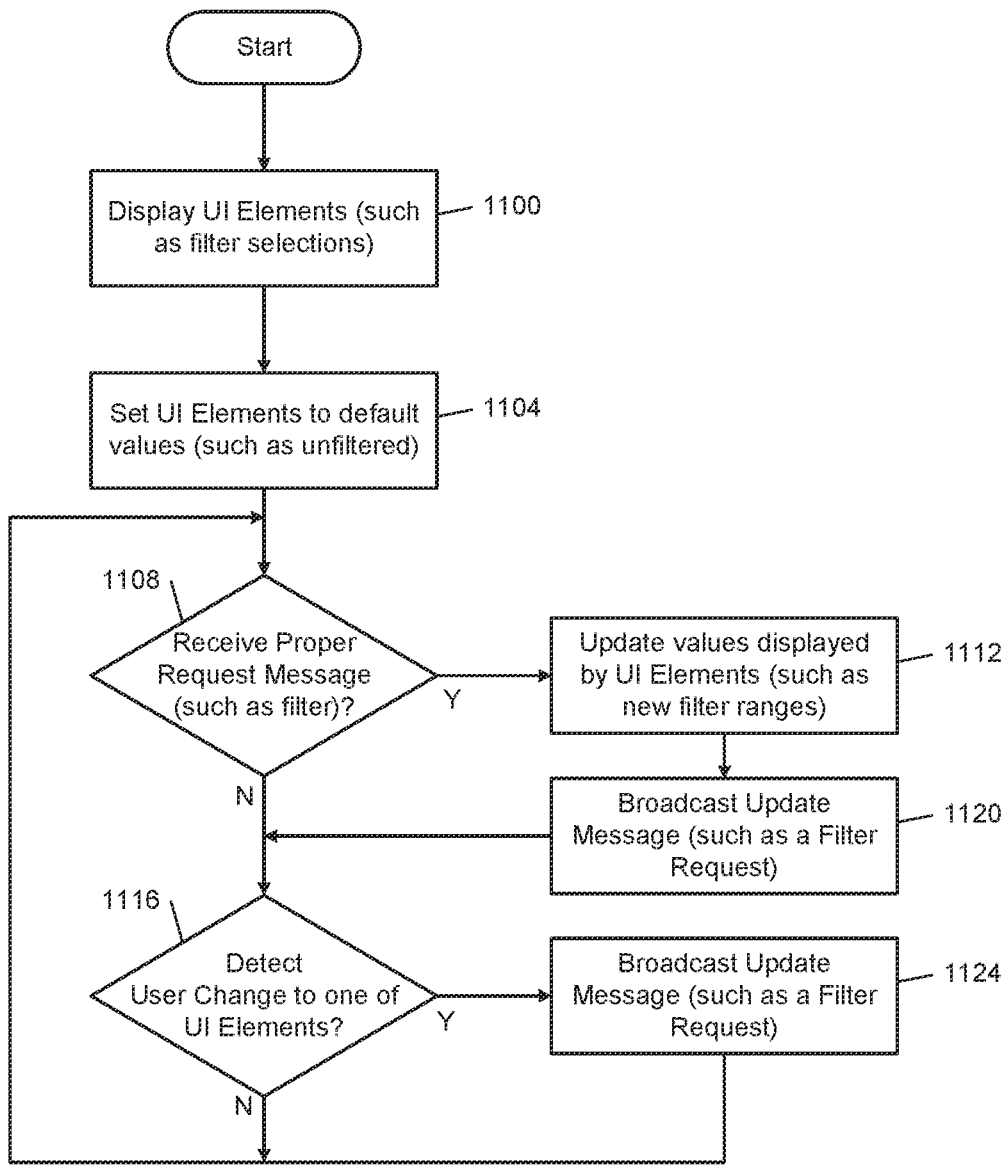
FIG. 13 is a flowchart of example user interface operation of the container.

In FIG. 13, example operation of certain user interface elements of the container begins, upon frame load, at 1100. At 1100, control displays user interface (UI) elements, such as potential filter selections. At 1104, control sets the UI elements to default values, which may be unfiltered and encompass the full range of options for the filter. At 1108, control determines whether a proper request message has been received. For example, this may be a request to perform filtering. If a proper request message has been received, control transfers to 1112; otherwise, control transfers to 1116.

At 1112, control updates values displayed by the UI elements, such as specifying the new filter ranges. Control then continues at 1120, where an update message is broadcast based on the request message. Control then continues at 1116. At 1116, control determines whether a user change to one of the UI elements has been detected. If so, control transfers to 1124; otherwise, control returns to 1108. At 1124, control broadcasts an update message based on the change to the UI element. For example, this update message may be a filtering request to indicate that the user changed a filter parameter. Control then returns to 1108.

Figure 14:
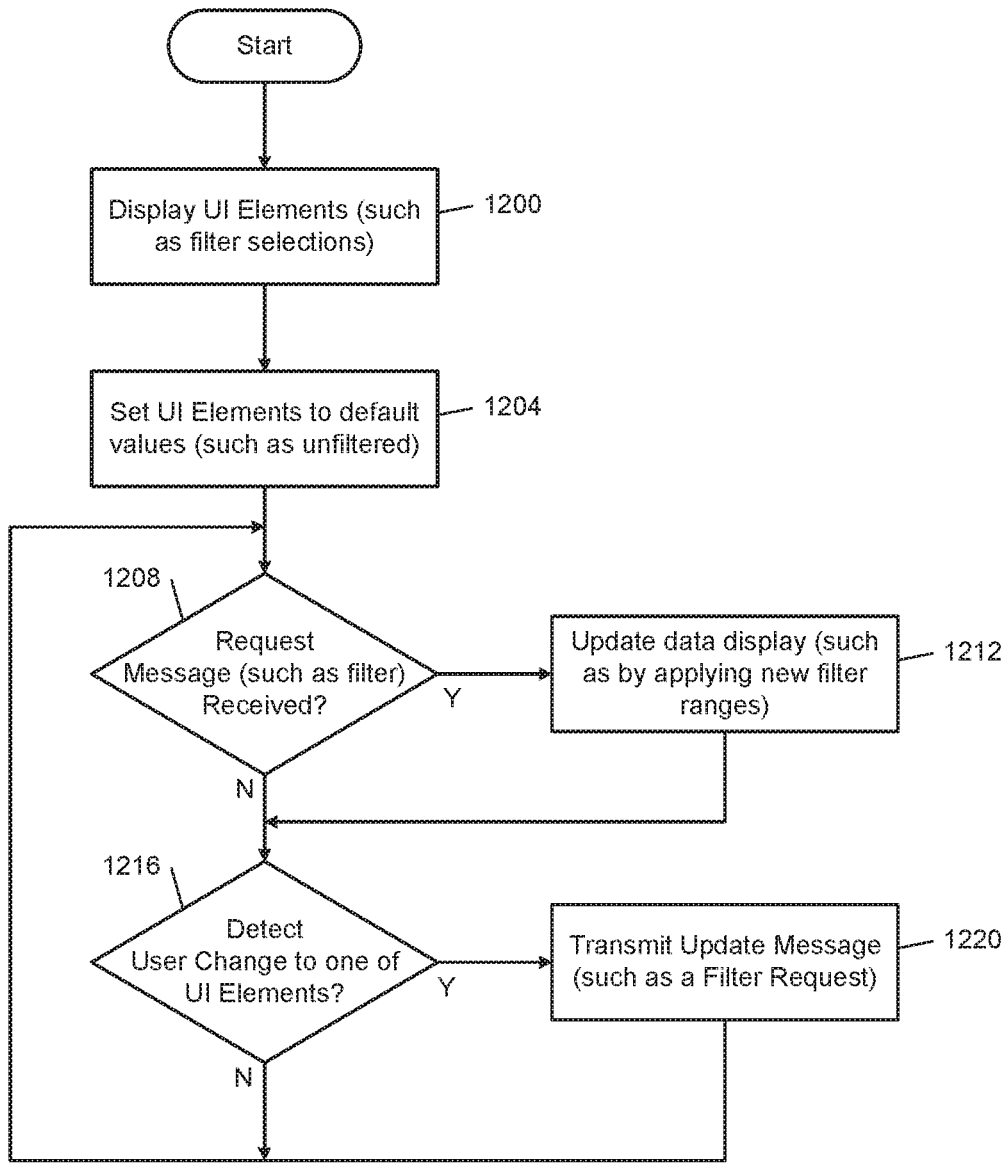
FIG. 14 is a flowchart of example user interface operation for a frame.

In FIG. 14, control is shown for example user interface operations in a frame. Control begins upon frame loading at 1200. At 1200, control displays UI elements, such as available filter selections. At 1204, control sets the UI elements to default values, such as to unfiltered defaults. At 1208, control determines whether a request message, such as a filter instruction, has been received. If so, control transfers to 1212; otherwise, control transfers to 1216.

At 1212, control updates data display, such as by applying new filter ranges. Control then continues at 1216. At 1216, control detects whether the user has changed one of the UI elements, such as adjusting a filter by dragging a slider bar. If a UI element change has been detected, control transfers to 1220; otherwise, control returns to 1208. At 1220, control transmits an update message, such as a filter request, to the parent page. Control then returns to 1208.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A system, comprising:
processor hardware; and
memory hardware that stores instructions that, when executed by the processor hardware, cause the processor hardware to perform operations including:
presenting data from a distributed network of data sources via a user interface of a user device associated with a user, by:
in response to receiving a page load request from the user device, by a container server,
identifying a set of frames associated with the user, by the container server, wherein the set of frames includes individual ones of the distributed network of data sources loaded into respective frames of a container page;
authenticating the set of frames, by the container server, to identify authenticated frames; and
generating the container page for display via the user interface, by the container server, wherein the container page includes the authenticated frames;
facilitating secure communications between the authenticated frames of the container page, by:
receiving a message from a first one of the authenticated frames, by the container server;
verifying authenticated status of the first one, by the container server;
identifying one or more target frames associated with the message, by the container server, wherein the authenticated frames include the one or more target frames;
transmitting the message to the one or more target frames, based on the authenticated status, to generate a transmitted message, including, when the message includes an indicator for broadcast, re-broadcasting the message to the authenticated frames, in response to the indicator, wherein transmitting the message comprises re-broadcasting the message; and presenting an updated version of the data from the distributed network of data sources, based on the secure communications, by:
    updating the container page presented via the user device, by the container server, based on at least the transmitted message, to generate an updated container page, wherein the updated version includes the updated container page.

2. The system of claim 1, wherein the operations further comprise:
determining the message includes a filter request, by the container server; and
synchronizing a plurality of data sources from the distributed network, by:
    displaying filter parameters based on the filter request; and
    broadcasting the message including the filter request to the authenticated frames, in response to the filter request, wherein transmitting the message comprises broadcasting the message including the filter request;
wherein updating the container page further comprises presenting synchronized versions of the authenticated frames updated according to the filter parameters.

3. The system of claim 1, wherein the operations further comprise:
when the message includes a data request,
    identifying a target frame, based on the data request, wherein the one or more target frames include the target frame;
    determining suitability of the target frame to satisfy the data request; and
    transmitting the data request to the target frame, based on the suitability, wherein transmitting the message comprises transmitting the data request.

4. The system of claim 1, wherein the operations further comprise:
when the message includes a data response to a data request,
    identifying a data requestor frame associated with the data request, to create an identified data requestor frame; and
    forwarding the data response to the identified data requestor frame, wherein transmitting the message comprises forwarding the data response.

5. The system of claim 1, wherein verifying authenticated status of the first one, by the container server, further comprises:
identifying a source identifier for the first one of the authenticated frames, from the message;
comparing the source identifier to stored, authenticated identifiers, to locate a match; and
when the source identifier matches one of the stored, authenticated identifiers,
    determining previous authentication of the first one, based on the match; and
    verifying the authenticated status of the first one, based on the previous authentication.

6. The system of claim 1, wherein the operations further comprise:
determining whether the message indicates a broadcast;
when the message does not indicate a broadcast, determining whether the message includes a filter request; and
when the message includes the filter request,
    broadcasting the message including the filter request to the authenticated frames, in response to the filter request, wherein transmitting the message comprises broadcasting the message including the filter request.

7. A method, comprising:
presenting data from a distributed network of data sources via a user interface of a user device associated with a user, by:
    in response to receiving a page load request from the user device, by a container server,
        identifying a set of frames associated with the user, by the container server, wherein the set of frames includes individual ones of the distributed network of data sources loaded into respective frames of a container page;
        authenticating the set of frames, by the container server, to identify authenticated frames; and
        generating the container page for display via the user interface, by the container server, wherein the container page includes the authenticated frames;
facilitating secure communications between the authenticated frames of the container page, by:
    receiving a message from a first one of the authenticated frames, by the container server;
    verifying authenticated status of the first one, by the container server;
    identifying one or more target frames associated with the message, by the container server, wherein the authenticated frames include the one or more target frames; and
    transmitting the message to the one or more target frames, based on the authenticated status, to generate a transmitted message, including, when the message includes an indicator for broadcast, re-broadcasting the message to the authenticated frames, in response to the indicator, wherein transmitting the message comprises re-broadcasting the message; and
presenting an updated version of the data from the distributed network of data sources, based on the secure communications, by:
    updating the container page presented via the user device, by the container server, based on at least the transmitted message, to generate an updated container page, wherein the updated version includes the updated container page.

8. The method of claim 7, wherein verifying authenticated status of the first one, by the container server, further comprises:
identifying a source identifier for the first one of the authenticated frames, from the message;
comparing the source identifier to stored, authenticated identifiers, to locate a match; and
when the source identifier matches one of the stored, authenticated identifiers,
    determining previous authentication of the first one, based on the match; and
    verifying the authenticated status of the first one, based on the previous authentication.

9. The method of claim 7, further comprising:
when the message includes a filter request,
    displaying filter parameters based on the filter request; and
    broadcasting the message including the filter request to the authenticated frames, in response to the filter request, wherein transmitting the message comprises broadcasting the message including the filter request.

10. The method of claim 7, further comprising:
determining whether the message indicates a broadcast;
when the message does not indicate a broadcast, determining whether the message includes a filter request; and
when the message includes the filter request,
  broadcasting the message including the filter request to the authenticated frames, in response to the filter request, wherein transmitting the message comprises broadcasting the message including the filter request.

11. The method of claim 7, further comprising:
when the message includes a data request,
  storing an identity of a data requestor frame, to create a stored identity, wherein the first one of the authenticated frames comprises the data requestor frame;
receiving a second message from a second one of the authenticated frames, by the container server, wherein the second message includes a data response to the data request, and wherein the second one includes a data response frame;
verifying a second authenticated status of the second one, by the container server;
identifying the data requestor frame associated with the second message, by the container server, based on the stored identity, wherein the authenticated frames include the data requestor frame and the data response frame;
transmitting the second message to the data requestor frame, based on the second authenticated status, to generate a second transmitted message; and
presenting a second updated version of the data from the distributed network of data sources, based on the secure communications, by:
  updating the container page presented via the user device based on at least the second transmitted message, to generate a second updated container page, wherein the second updated version includes the second updated container page.

12. The method of claim 11, further comprising:
when the message includes a data response to a data request,
  identifying a data request ID assigned to the data requestor frame, by the container server, wherein the data request ID is included in an original transmission of the data request;
  matching the data response to the data requestor frame, by the container server, to create an identified data requestor frame; and
  forwarding the data response to the identified data requestor frame, wherein transmitting the message comprises forwarding the data response.

13. The method of claim 7, wherein authenticating the set of frames further comprises:
assigning a frame identifier to one of the set of frames, by the container server;
transmitting a handshake communication to the one of the set of frames, by the container server, wherein the handshake communication includes the frame identifier and a container identifier for the container page; and
receiving a handshake complete message from the one of the set of frames, in response to transmitting the handshake communication, wherein the handshake complete message is transmitted using the container identifier; and
storing the frame identifier for future verification of communications from the one of the set of frames, by the container server, wherein the authenticated frames include the one of the set of frames, and wherein the authenticated frames are associated with a plurality of stored frame identifiers.

14. A non-transitory computer-readable medium comprising instructions including:
presenting data from a distributed network of data sources via a user interface of a user device associated with a user, by:
  in response to receiving a page load request from the user device, by a container server,
    identifying a set of frames associated with the user, by the container server, wherein the set of frames includes individual ones of the distributed network of data sources loaded into respective frames of a container page;
    authenticating the set of frames, by the container server, to identify authenticated frames; and
    generating the container page for display via the user interface, by the container server, wherein the container page includes the authenticated frames;
facilitating secure communications between the authenticated frames of the container page, by:
  receiving a message from a first one of the authenticated frames, by the container server;
  verifying authenticated status of the first one, by the container server;
  identifying one or more target frames associated with the message, by the container server, wherein the authenticated frames include the one or more target frames; and
  transmitting the message to the one or more target frames, based on the authenticated status, to generate a transmitted message, including, when the message includes an indicator for broadcast, re-broadcasting the message to the authenticated frames, in response to the indicator, wherein transmitting the message comprises re-broadcasting the message; and
presenting an updated version of the data from the distributed network of data sources, based on the secure communications, by:
  updating the container page presented via the user device, by the container server, based on at least the transmitted message, to generate an updated container page, wherein the updated version includes the updated container page.

15. The non-transitory computer-readable medium of claim 14, wherein verifying authenticated status of the first one, by the container server, further comprises:
identifying a source identifier for the first one of the authenticated frames, from the message;
comparing the source identifier to stored, authenticated identifiers, to locate a match; and
when the source identifier matches one of the stored, authenticated identifiers,
  determining previous authentication of the first one, based on the match; and
  verifying the authenticated status of the first one, based on the previous authentication.

16. The non-transitory computer-readable medium of claim 14, wherein the instructions include:
when the message includes a filter request,
  displaying filter parameters based on the filter request; and
  broadcasting the message including the filter request to the authenticated frames, in response to the filter request, wherein transmitting the message comprises broadcasting the message including the filter request.

17. The non-transitory computer-readable medium of claim 14, wherein the instructions include:
- determining whether the message indicates a broadcast;
- when the message does not indicate a broadcast, determining whether the message includes a filter request; and
- when the message includes the filter request,
  - broadcasting the message including the filter request to the authenticated frames, in response to the filter request, wherein transmitting the message comprises broadcasting the message including the filter request.

18. The non-transitory computer-readable medium of claim 14, wherein the instructions include:
- when the message includes a data request,
  - storing an identity of a data requestor frame, to create a stored identity, wherein the first one of the authenticated frames comprises the data requestor frame;
- receiving a second message from a second one of the authenticated frames, by the container server, wherein the second message includes a data response to the data request, and wherein the second one includes a data response frame;
- verifying a second authenticated status of the second one, by the container server;
- identifying the data requestor frame associated with the second message, by the container server, based on the stored identity, wherein the authenticated frames include the data requestor frame and the data response frame;
- transmitting the second message to the data requestor frame, based on the second authenticated status, to generate a second transmitted message; and
- presenting a second updated version of the data from the distributed network of data sources, based on the secure communications, by:
  - updating the container page presented via the user device based on at least the second transmitted message, to generate a second updated container page, wherein the second updated version includes the second updated container page.

19. The non-transitory computer-readable medium of claim 18, wherein the instructions include:
- when the message includes a data response to a data request,
  - identifying a data request ID assigned to the data requestor frame, by the container server, wherein the data request ID is included in an original transmission of the data request;
  - matching the data response to the data requestor frame, by the container server, to create an identified data requestor frame; and
  - forwarding the data response to the identified data requestor frame, wherein transmitting the message comprises forwarding the data response.

20. The non-transitory computer-readable medium of claim 14, wherein authenticating the set of frames further comprises:
- assigning a frame identifier to one of the set of frames, by the container server;
- transmitting a handshake communication to the one of the set of frames, by the container server, wherein the handshake communication includes the frame identifier and a container identifier for the container page; and
- receiving a handshake complete message from the one of the set of frames, in response to transmitting the handshake communication, wherein the handshake complete message is transmitted using the container identifier; and
- storing the frame identifier for future verification of communications from the one of the set of frames, by the container server, wherein the authenticated frames include the one of the set of frames, and wherein the authenticated frames are associated with a plurality of stored frame identifiers.

\* \* \* \* \*